United States Patent [19]
Tsuruta et al.

[11] Patent Number: 5,615,184
[45] Date of Patent: Mar. 25, 1997

[54] DISC PLAYING DEVICE

[75] Inventors: Yukiyasu Tsuruta, Sanda; Tetsuo Noda, Ikoma; Akihiro Yoshioka, Daito, all of Japan

[73] Assignee: Sanyo Electric Co., Ltd., Osaka, Japan

[21] Appl. No.: 175,282

[22] Filed: Dec. 28, 1993

[30] Foreign Application Priority Data

Dec. 28, 1992 [JP] Japan .................. 4-348500

[51] Int. Cl.⁶ .................................. G11B 17/22
[52] U.S. Cl. .......................................... 369/37
[58] Field of Search ..................... 369/36, 37, 178, 369/191, 192

[56] References Cited

U.S. PATENT DOCUMENTS

| | | |
|---|---|---|
| 3,165,321 | 1/1965 | Osborne et al. ............... 369/192 |
| 4,984,228 | 1/1991 | Agostini ......................... 369/37 |
| 5,050,148 | 9/1991 | Simpson . | |
| 5,197,056 | 3/1993 | Van Heusden et al. ........ 369/191 |
| 5,214,628 | 5/1993 | Langman et al. .............. 369/192 |
| 5,235,579 | 8/1993 | Ross .............................. 369/37 |
| 5,251,192 | 10/1993 | Lin ................................ 369/37 |

FOREIGN PATENT DOCUMENTS

| | | |
|---|---|---|
| 0143554 | 6/1985 | European Pat. Off. . |
| 0148505 | 7/1985 | European Pat. Off. . |
| 0183672 | 6/1986 | European Pat. Off. . |
| 3931715 | 4/1990 | Germany . |
| 4121297 | 1/1992 | Germany . |
| 0331839 | 9/1989 | Japan . |
| 2-172057 | 7/1990 | Japan . |
| 4-57248 | 2/1992 | Japan . |

Primary Examiner—Stuart S. Levy
Assistant Examiner—Allen Cao
Attorney, Agent, or Firm—Armstrong, Westerman, Hattori, McLeland & Naughton

[57] ABSTRACT

A disc playing device including a magazine rotatably mounted on a base chassis, and a guide member attached to the base chassis so as to cover the magazine and permitting the rotation of the magazine. A pair of rollers are provided between a front panel and magazine. The disc is accommodated in the magazine by the rollers through a slit in the from panel. The magazine rotates to transport the disc to a playing portion, and the disc is pushed out by a kick-out member and then held between a clamp and a head mount assembly. The clamp and the assembly are pivotally movable by a slide plate.

2 Claims, 36 Drawing Sheets

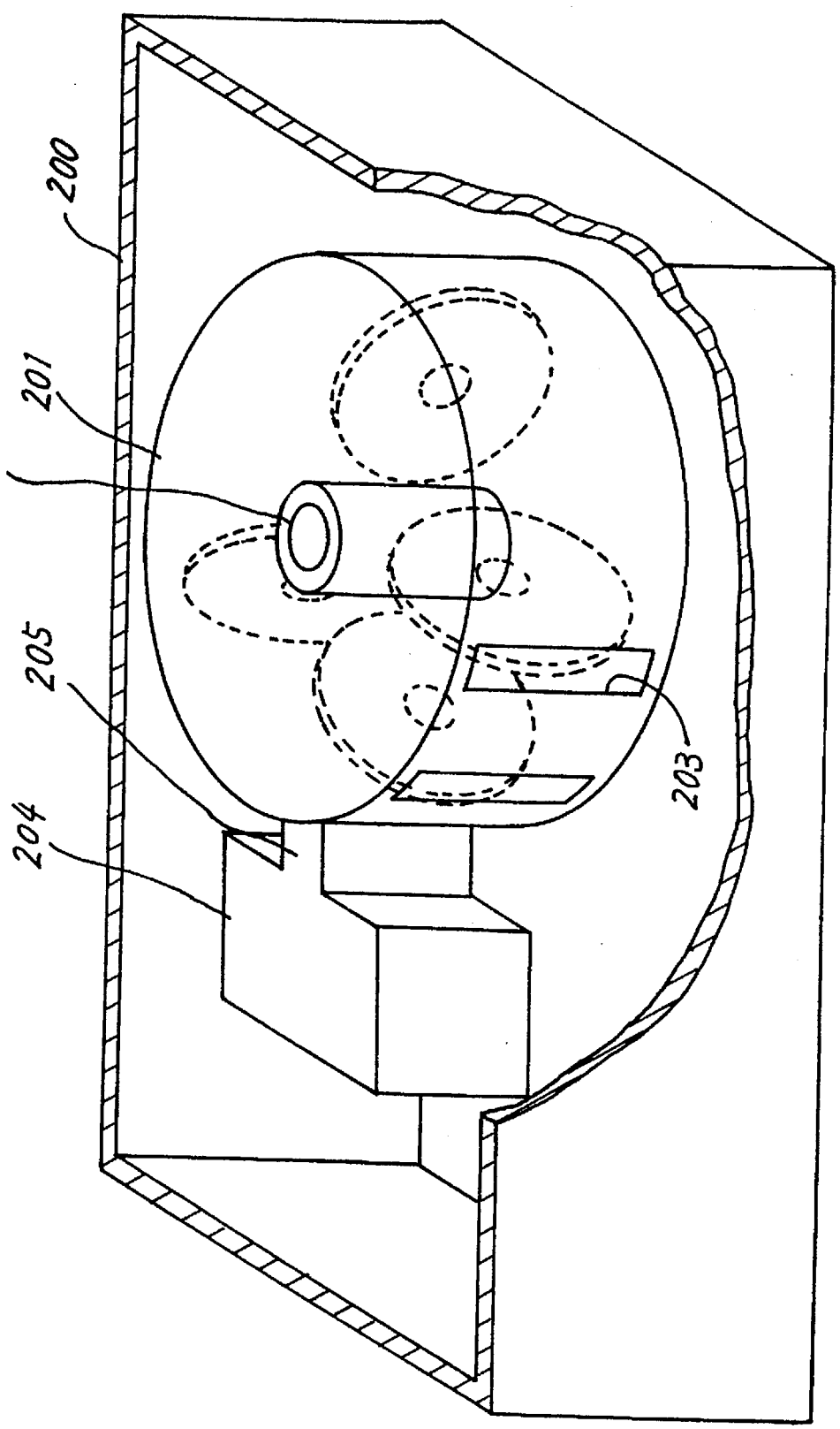

DISC PLAYING DEVICE

BACKGROUND OF THE INVENTION

1. Field of the Invention

The present invention relates to a disc playing device for accommodating a plurality of discs having data recorded thereon to play the desired disc, or to unload the disc and replace the disc with another disc.

2. Description of the Related Art

Known disc playing devices include the one disclosed in Examined Japanese Patent Publication HEI 2-172057.

With reference to FIG. 38 showing the disclosed device, a magazine 201 is rotatably mounted on a shaft 202 provided upright on a chassis 200. The magazine 201 is cylindrical, is closed at its top and bottom and has a plurality of holding grooves 203 extending radially from its periphery toward the shaft 202 for accommodating discs D. A read-write unit 204 is provided close to the path of rotation of the magazine 201, and a disc movement controller 205 is disposed beside the unit 204. The desired one of the discs D is withdrawn from the magazine 201 and transported to the read-write unit 204 by the disc movement controller 205.

When the specified disc D is to be played, the disc D in the read-write unit 204 is first withdrawn therefrom and accommodated in the magazine 201 by the disc movement control unit 205. Next, the magazine 201 is rotated about the shaft 202 to transport the holding groove 203 containing the specified disc D to the control unit 205. The control unit 205 withdraws the disc D from the groove 203 and inserts the disc D into the read-write unit 204. Thus, the disc D is played.

Examined Japanese Patent Publication HEI 4-57248 discloses another disc playing device, manifestly showing a mechanism by which discs are withdrawn from or inserted into a magazine.

With reference to FIGS. 36 and 37 showing the disclosed device, a disc magazine 610 is rotatably mounted on a base chassis 600. Arranged outside the path of rotation of the magazine 610 are two playing portions 630, 630 and a single inlet-outlet portion 620.

The magazine 610 is cylindrical and has in its outer peripheral portion a plurality of grooves 611, 614 extending radially toward the center of rotation. The disc D can be accommodated in an upright position in the magazine 610 with its upper and lower portions fitted in the grooves 611, 614.

The lower grooved portion 611 is formed at its outer end with a cutout 612, in which a plate spring 613 is provided partially projecting outward therefrom.

The inlet-outlet portion 620 is provided with a kick-out arm 621 pivotally movable in a vertical plane for kicking out the disc from the magazine 610. Each of the playing portions 630, 630 has a kick-out arm 631 for kicking out the disc D to a playing set position 633 and a kick-in arm 632 for kicking the disc D from the playing set position 633 into the magazine 610, these arms 631, 632 each being pivotally movable in a vertical plane.

When the disc D is pushed into the magazine 610 from outside the inlet-outlet portion 620, the disc D is inserted into the magazine 610 and guided by the grooves 611, 614. In the course of insertion, the disc D moves over the plate spring 613 by depressing the spring, whereupon the spring 613 resiliently restores itself to prevent the disc D from jumping out inadvertently.

When a particular disc selected by the user is to be played, the magazine 610 rotates to position the selected disc as opposed to the empty one of the two playing portions 630, 630, and the disc D is kicked out by the kick-out arm 631 to the playing position 633 of the playing portion 630.

On completion of playing of the disc D, the disc is kicked to the original position within the magazine 610 by the kick-in arm 632.

However, the disc playing device described above suffers from the following problems:

1. The magazine 610 has the grooves 611, 614 in its peripheral portion and is closed at its top. The magazine 610 is therefore large-sized, heavy and difficult to control for rotation. The grooves 611, 614 are also difficult to make.

2. With the latter conventional device, i.e., the disc playing device of FIGS. 36 and 37, each groove 611 of the magazine 610 needs to be provided with the plate spring 613 for preventing the disc D from jumping out. This increases the number of components and requires a cumbersome assembling procedure. The disc D is likely to become damaged by forcible frictional contact of the disc outer periphery with the plate spring 613 every time the disc is inserted into or withdrawn from the magazine 610.

Further when the body of the device is subjected to an external impact, the disc will not be effectively retained only by the plate spring 613 and the top wall of the magazine 610 but is likely to slip off from the magazine 610 within the device.

3. With the conventional disc playing device (FIGS. 36 and 37), it is likely that the user will forcibly push the disc into the magazine 610 when the disc is forced out from the magazine 610 by the kick-out arm 621 and projected out from the device. An excessive force will then act between the kick-out arm 621 and the disc, possibly causing damage to the disc.

SUMMARY OF THE INVENTION

An object of the present invention is to provide a disc playing device which comprises a magazine rotatably mounted on a base chassis and formed with disc holding grooves, and a guide member mounted on the base chassis and covering the magazine from above, the magazine and the guide member forming a two-component structure for holding discs so as to make the magazine lightweight and easily controllable for rotation and to render the disc holding grooves easy to make.

Another object of the invention is to provide a disc playing device of the type described above wherein each of the disc holding grooves has an intermediate portion lower than the outer portion thereof so that the disc slides down the intermediate portion of the groove under the force of gravity when brought into the magazine, and is prevented from falling from the magazine even when an impact acts on the body of the device although no plate spring is used to reduce the number of components.

Another object of the invention is to provide between disc insertion-discharge means and the central portion of the magazine a pair of rollers and a kick-out member for kicking out the disc from the magazine toward the rollers so that the disc is prevented from becoming damaged even if the disc is inserted again while the disc is being discharged or when the disc has been completely discharged.

Another object of the invention is to provide between disc playing means and the magazine a kick-out member for kicking out the disc by a stroke length not greater than the diameter of the disc for a pair of rollers to hold the disc as projected from the magazine and discharge the disc, the kick-out member further being operable to restrain the magazine from rotation. Thus, the object of the invention is to give the kick-out member the two functions of transporting the disc and locking the magazine.

Another object of the invention is to cause a single slide plate to move the pair of rollers, which are provided between the playing means and the magazine, toward or away from each other and also to pivotally move a head mount assembly having a turntable and a frame, which provide the playing means, toward or away from each other, the frame being adapted to press the disc against the turntable.

With the disc playing device of the present invention, the magazine is rotatably supported by a base chassis and formed with disc holding grooves, and a guide member covering the magazine is fixed to the base chassis. The guide member and the magazine provide a two-component structure for holding discs. Accordingly, the magazine is made lightweight and easy to control for rotation.

The disc holding groove has a length larger than the diameter of the disc and an intermediate portion which is lower than its outer end at the outer periphery of the magazine. When the disc is inserted into the magazine, the disc rolls down to the intermediate portion under gravity and is accommodated in the magazine. When the magazine rotates, the guide member covering the discs prevents the disc frown jumping out inadvertently.

When the disc is to be taken out from the magazine, the kick-out member disposed inwardly of the magazine pushes out the disc and transports the disc until the disc is held between a pair of rollers. The rollers rotate with the disc held therebetween to discharge the disc outside the magazine. Even if the disc is forcibly pushed into the magazine while the disc is being discharged or upon completion of discharge, the pushing force does not act directly on the kick-out member or the disc because the disc is held between the rollers which are shippable and further because the take-out stroke length of the kick-out member is shorter than the distance the disc is discharged to outside the device.

The distance the kick-out member moves until the disc is held between the rollers during the transport of the disc from the magazine to the playing means is not greater than the diameter of the disc. When the disc is held between the rollers, the kick-out member engages in the bottom of the disc holding groove to restrain the magazine from rotation. Accordingly, the path of transfer of the disc remains unshifted by external vibration until the disc is held between the rollers.

In the playing means, a slide plate is formed with cam grooves which have engaged therein the pair of rollers, a head mount assembly having a turntable and a frame for releasably pressing the disc against the turntable. The rollers are moved toward or away from each other and the head mount assembly and the frame are pivotally moved under the control of the slide plate, so that these movements can be easily controlled.

BRIEF DESCRIPTION OF THE DRAWINGS

FIG. 38 is a perspective view of another conventional device.

DETAILED DESCRIPTION OF THE PREFERRED EMBODIMENTS

Figure 1:
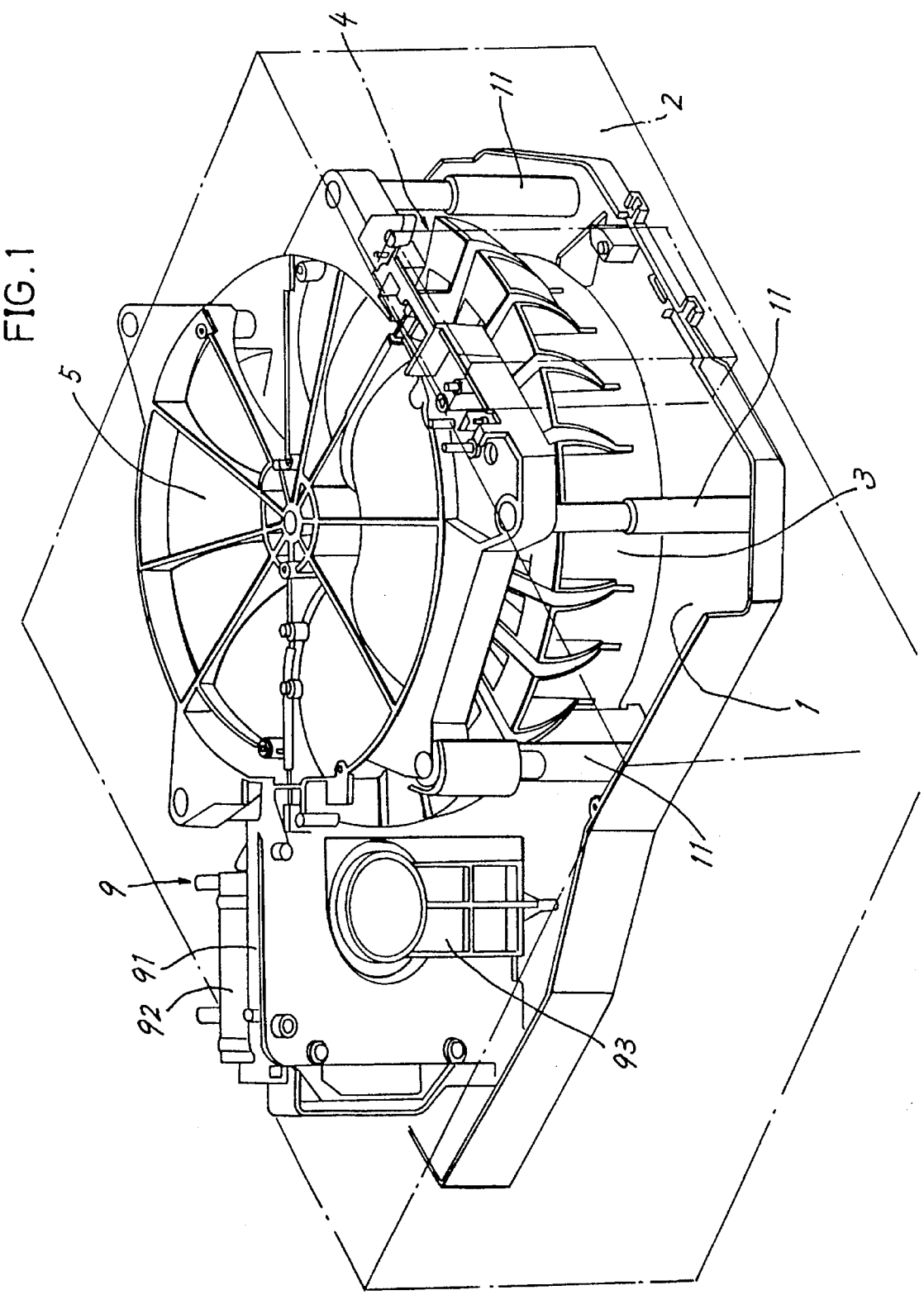
FIG. 1 is a perspective phantom view showing a disc playing device.

A disc playing device will be described below. Mechanisms will be described with respect to the construction, operation and advantages.

Brief Description of Overall Device (see FIGS. 1 to 3 and 12):

The preferred embodiment to be described is a device for playing discs having sound signals recorded thereon using a laser. While discs are available in two different standard sizes, i.e., 12 cm and 8 cm in diameter, the playing device is used specifically for 12-cm discs. However, the present invention is not limited thereto but can be embodied as devices for playing various disc-like recording media.

The disc playing device comprises a disc accommodating magazine 3 mounted on a base chassis 1 and rotatable in a horizontal plane, and disc insertion-discharge means 4 and disc playing means 9 which are arranged outside the path of rotation of the magazine 3.

The insertion-discharge means 4 and the playing means 9 are spaced apart by an angle of 135 degrees about the center of rotation of the magazine 3 so as to make the overall playing device more compact.

The magazine 3 is adapted to accommodate 24 discs D in a radial arrangement. The insertion-discharge means 4 has a delivery device 6 for inserting the disc D into the magazine 3 from the outside and discharging the disc D from the magazine 3 to the outside.

Figure 12:
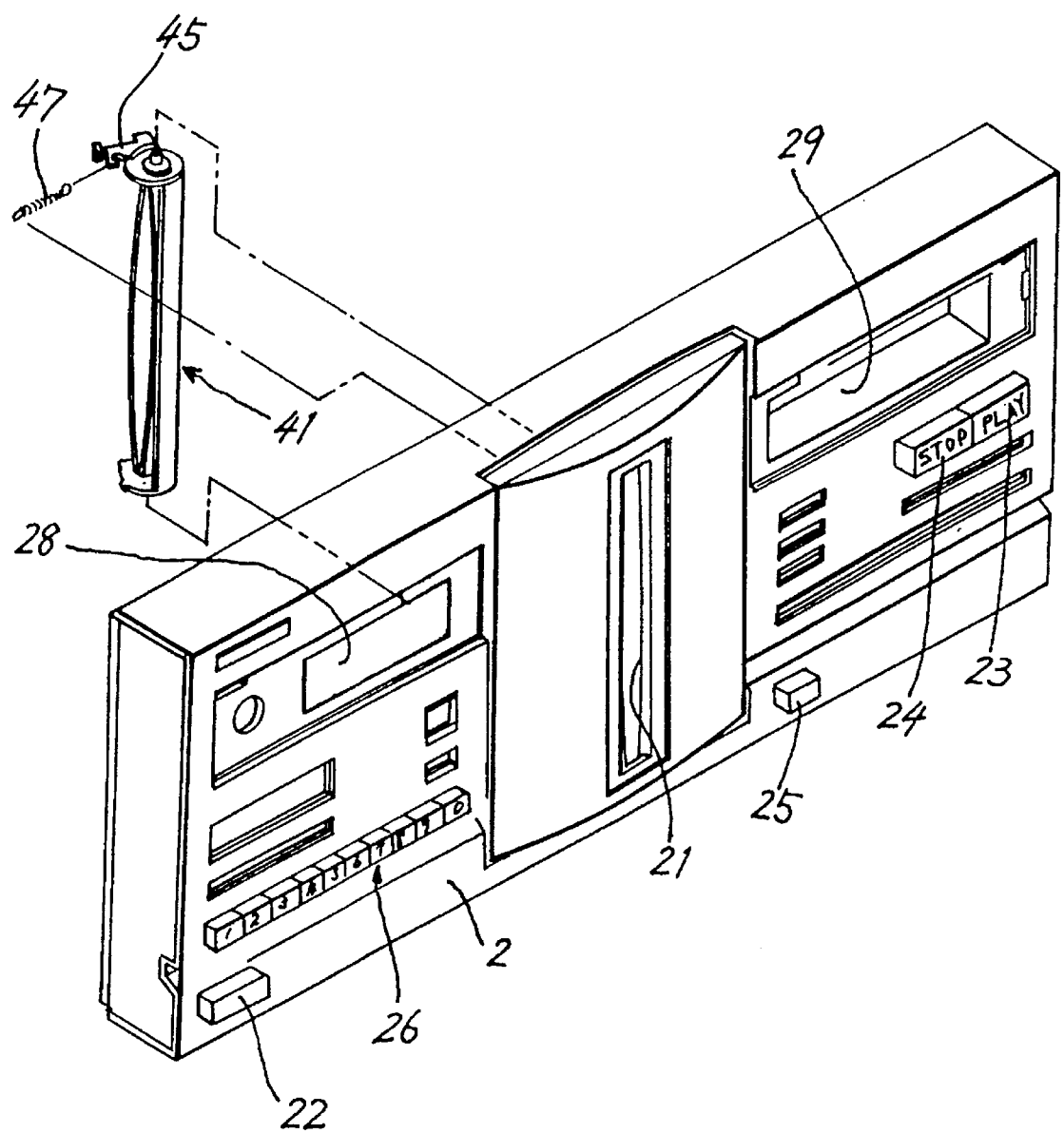
FIG. 12 is a perspective view of a front panel.

The insertion and discharge of discs D, and selection of playing and cessation of playing are effected by manipulating an ON-OFF button 22, PLAY button 23, STOP button 24, open/close button 25 and 10 number entry keys 26 which are provided on a front panel 2 of the playing device shown in FIG. 12. For example, when the disc to be played is selected by the user, the magazine 3 is rotated to transport the disc to the position of the playing means 9, and a delivery device 6a provided for the means 9 delivers the disc to the playing means 9.

On completion of playing, the disc is returned to its original position in the magazine 3.

The manipulation of the buttons on the front panel 2 will be described later.

Figure 2:
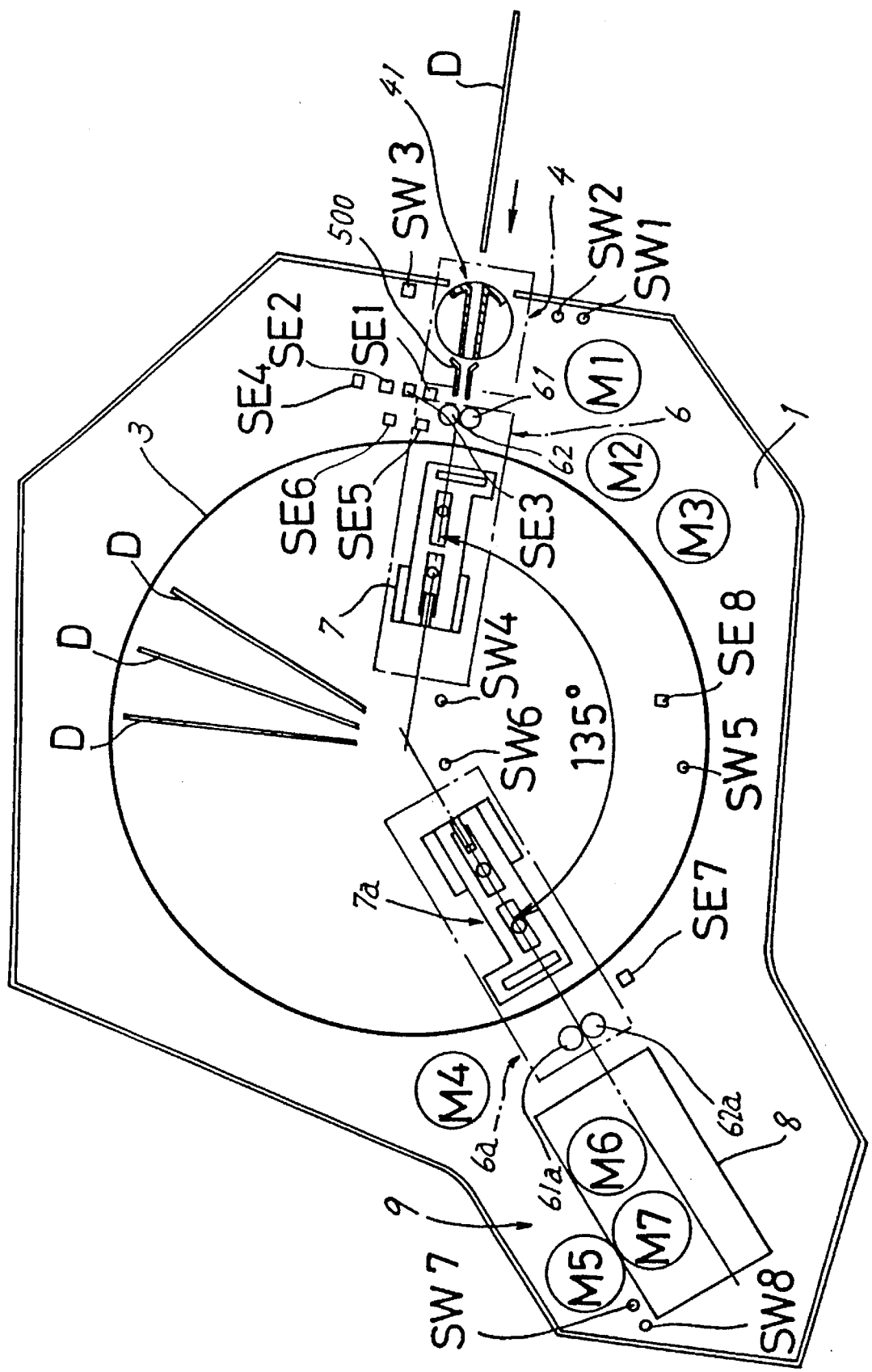
FIG. 2 is a plan view schematically showing the device.
Figure 3:
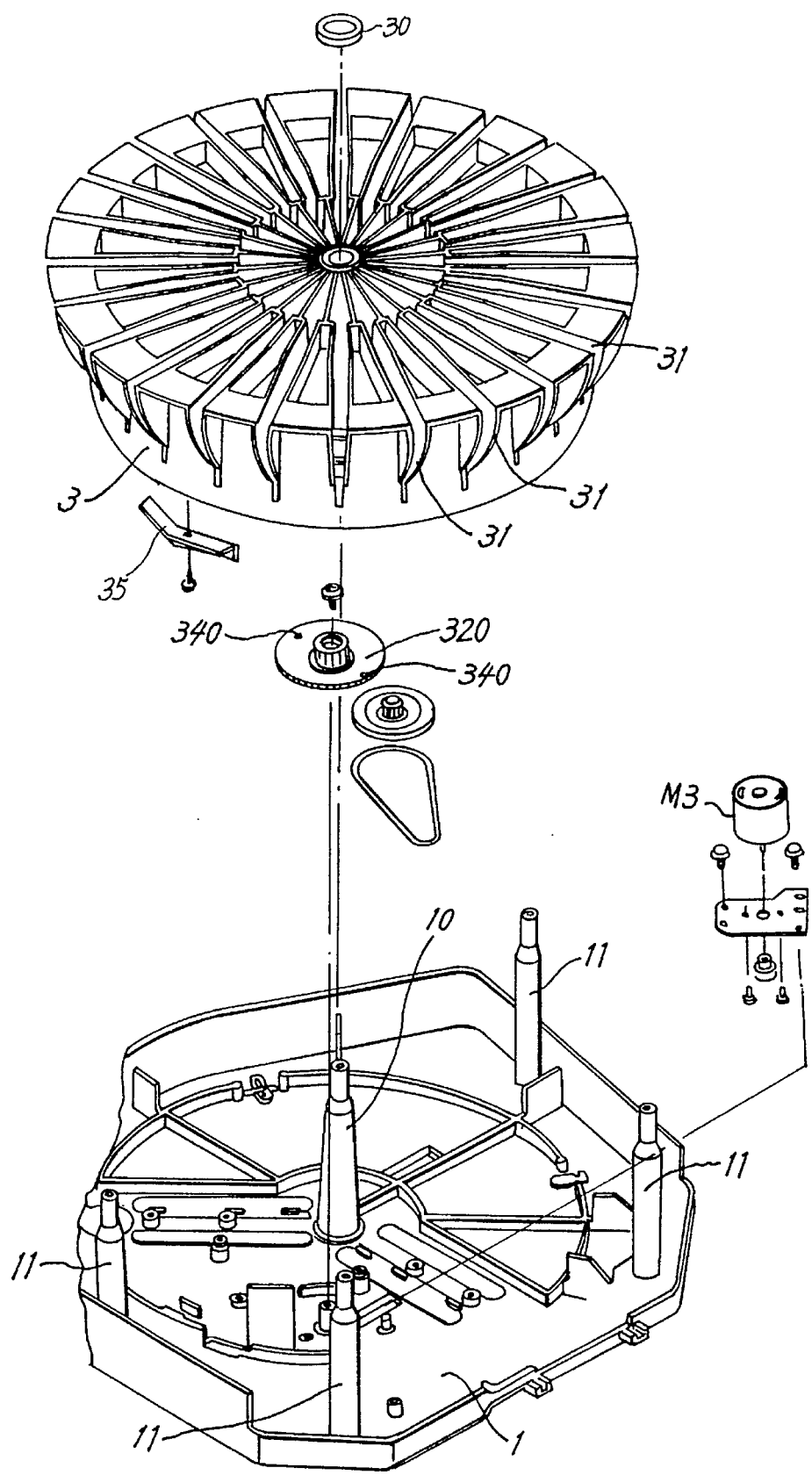
FIG. 3 is a perspective view of a base chassis and a magazine.

With reference to FIG. 2, indicated at M1 to M7 are drive motors for operating mechanisms to be described below, at SW1 to SW8 switches for detecting the position of completion of mechanism operations, at SE1 to SE7 sensors for detecting the size and passage of discs, and at SE8 a sensor for detecting the angle of rotation of the magazine 3. The arrangement of these components is shown in a plane.

Magazine 3 (see FIGS. 3 to 5 and 8):

The magazine 3 is in the form of a thick disk prepared from synthetic resin by injection molding, and has at its center a tubular portion 39 which is rotatably fitted to a support post 10 provided upright on the base chassis 1.

The magazine 3 is formed in its upper surface with 24 disc holding grooves 31 arranged generally radially at a spacing. Each of the grooves 31 has an outer end which is opened in an outer peripheral wall of the magazine 3, and a base end terminating at the tubular portion 39.

The number of disc holding grooves 31 is preferably 24 for reasons involved in design, that is, in order to give the smallest possible outside diameter to the magazine 3 while enabling the magazine to accommodate as many discs as possible. However, the number of grooves 31 is not limited specifically to 24.

Figure 34:
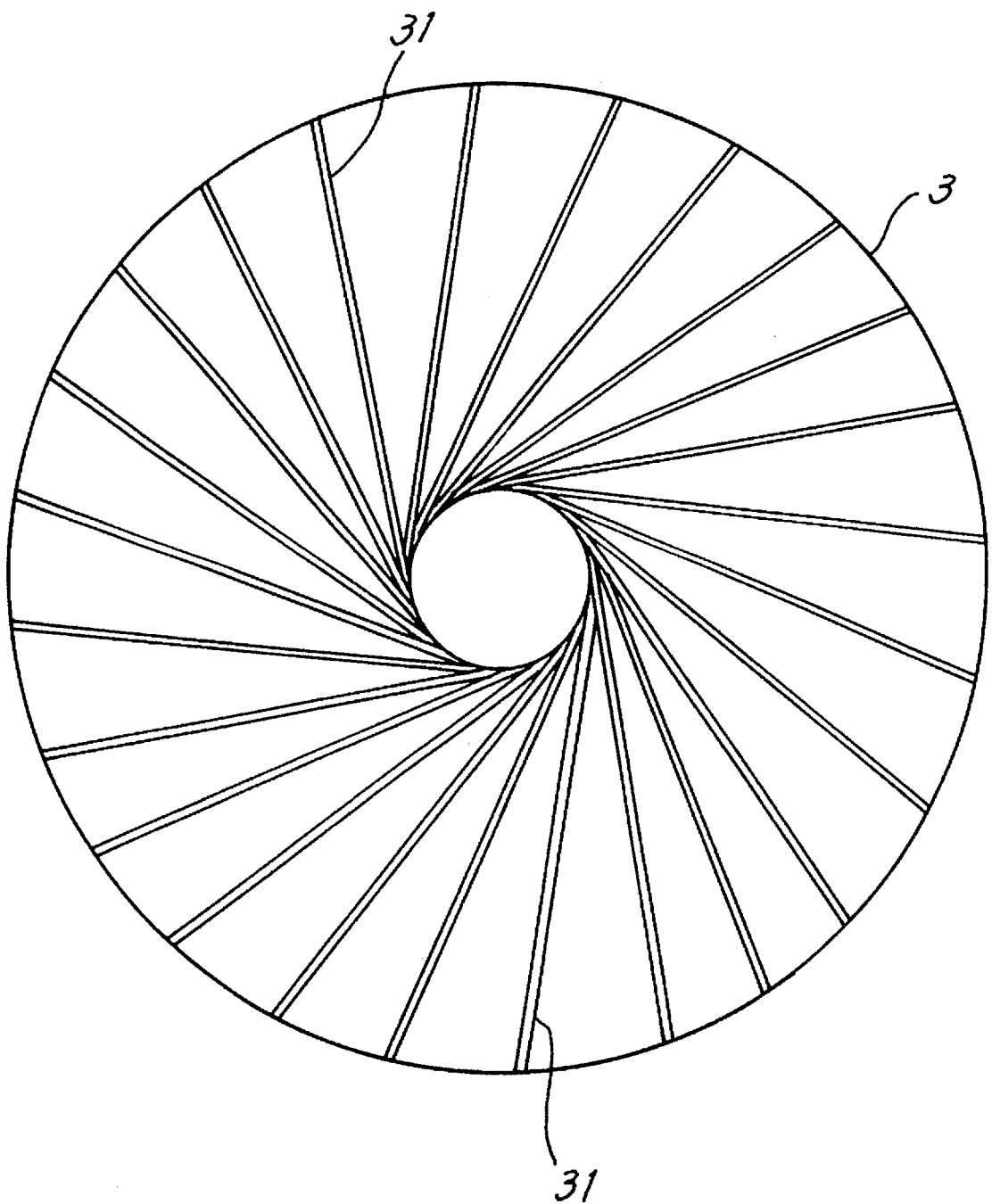
FIG. 34 is a plan view in section of a modified magazine for accommodating discs.

Although the disc holding grooves 31 of the present embodiment extend radially of the magazine 3, these grooves 31 can be made to extend from the central tubular portion 39 of the magazine 3, for example, tangentially of the portion 39 as seen in FIG. 34. The "generally radial" arrangement of the grooves 31 mentioned above includes the tangential arrangement of FIG. 34.

Although each groove 31 is formed in a plane perpendicular to the base chassis 1, each groove may be formed as slightly inclined with respect to the base chassis 1. The disc will then be accommodated in a slightly inclined upstanding position, with the result that the height of the disc accommodating portion can be diminished.

The upper surface of the magazine 3 is marked with the groove numbers of No. 1 to No. 24 as arranged counter-clockwise adjacent to the respective grooves 31.

Figure 8:
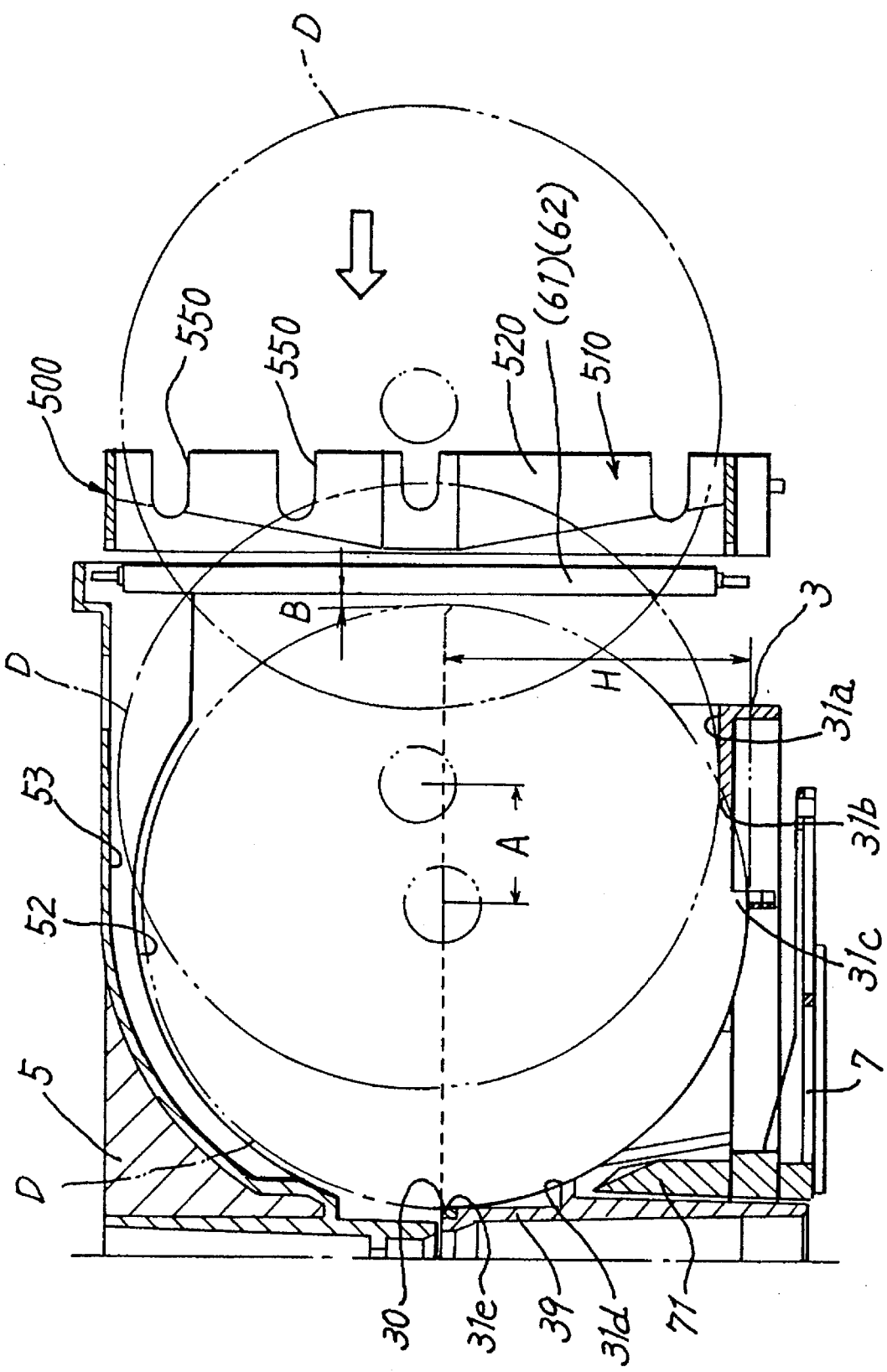
FIG. 8 is a diagram for illustrating how a disc rolls into the magazine.

As shown in FIG. 8, the bottom of the groove 31 has a lengthwise middle portion 31c which is 5 mm lower than the bottom 31a of opened portion in the outer peripheral wall of the magazine.

Over the entire length of each groove 31, the width of each groove 31 gradually decreases toward its bottom and also toward the center of rotation of the magazine 3. Further over the entire length, the width of each groove bottom is slightly larger than the thickness of the disc.

Figure 4:
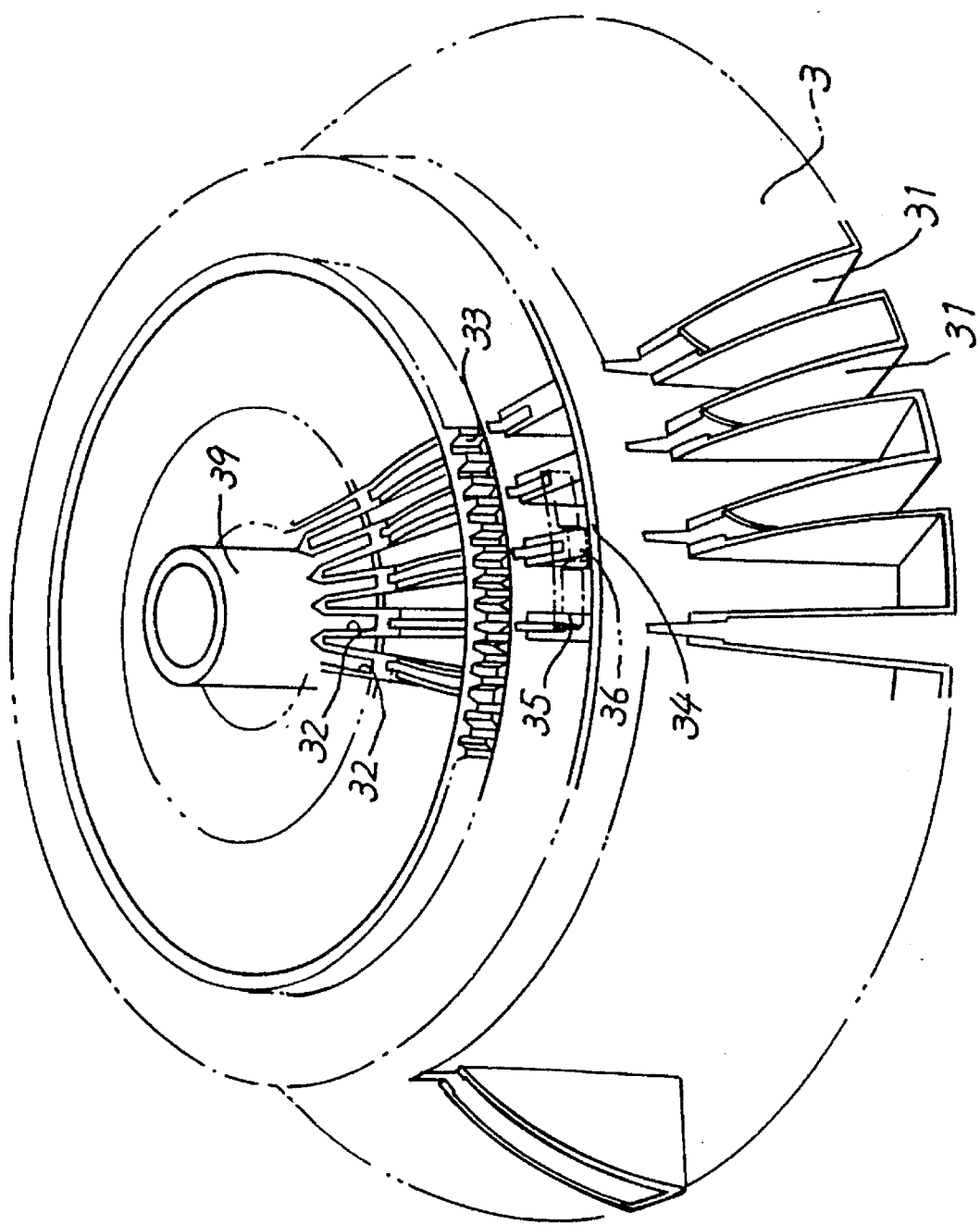
FIG. 4 is a perspective view of the magazine turned upside down.

FIG. 4 shows the magazine 3 as it is viewed from the rear side thereof. Each groove 31 is partly formed with a slit 32 extending through the bottom wall of the magazine 3. As seen in FIG. 8, the disc D as fitted in the holding groove 31 is in contact with the groove bottom at a plurality of locations 31b, 31c, 31d and 31e, where the outer peripheral portion of the disc bearing no signal is held, whereby the disc is supported almost without any backlash, with the signal bearing surface of the disc rendered free of contact with the groove wall.

An annular elastic member 30 is fitted to the upper end outer periphery 31e of the central tubular portion 39 of the magazine 3. The vertical height H from the lowest portion 31c of the bottom of the groove 31 to the upper edge of the elastic member 30 is about 6 cm and approximately equal to the radius of the disc D. Thus, the upper edge 31e at the upper end of the groove 31 is made higher than the lowest portion of the disc supporting groove bottom by an amount approximately corresponding to the radius of the disc, and the disc D can be stably supported by being held by the edge 31e.

The annular elastic member 30 prevents the disc D from producing an impulse noise that would occur if the disc comes into direct contact with the tubular portion 39 when rolling down the groove 31.

As shown in FIG. 4, the bottom of the magazine 3 has a drivingly rotating toothed ring 33 and an annular rib 34 arranged concentrically with the magazine, and a contact plate 35 for detecting the rotated position of the magazine 3.

Figure 5:
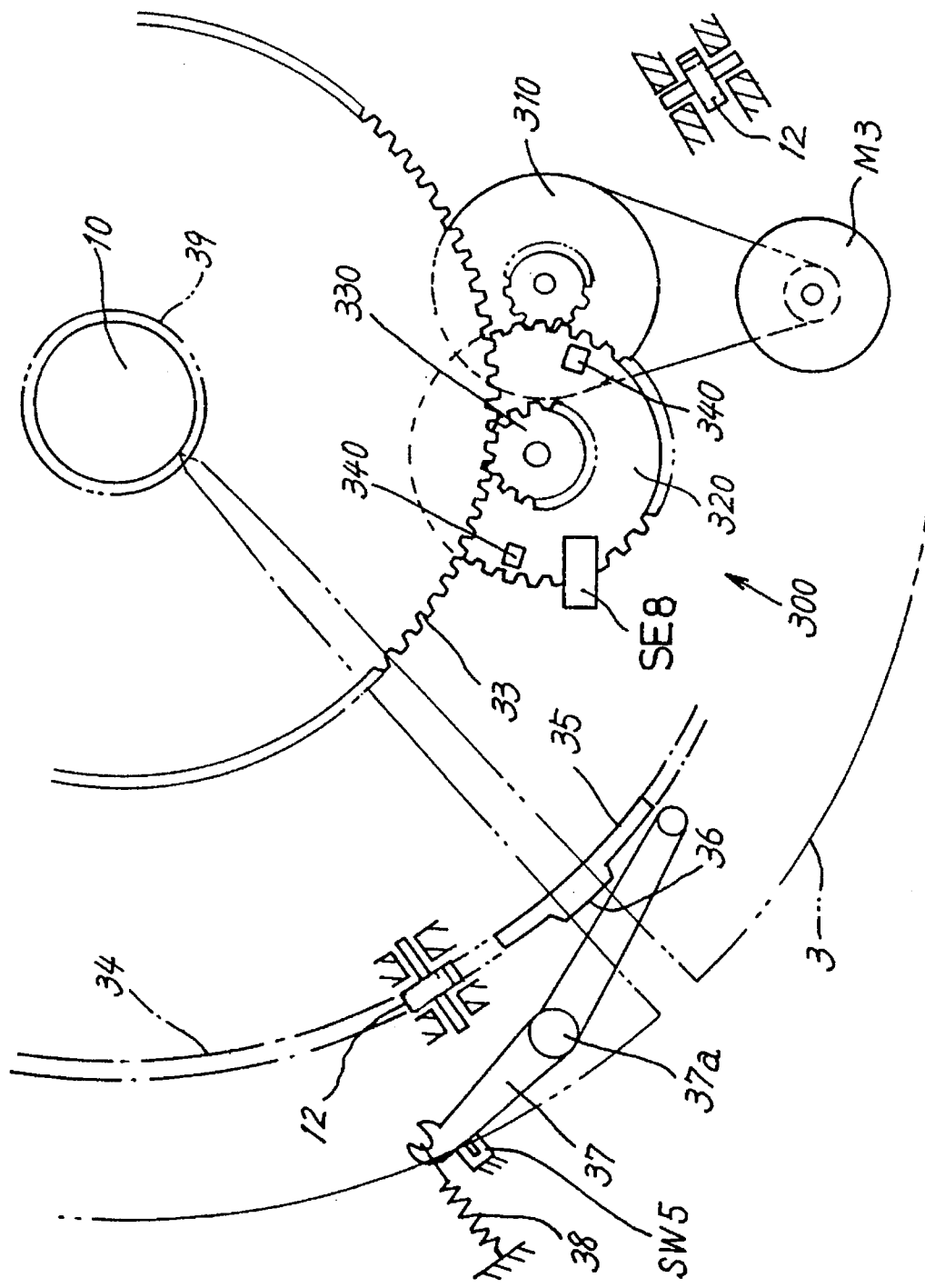
FIG. 5 is a diagram showing means for rotating and positioning the magazine.

As shown in FIG. 5, the rib 34 rests on a plurality of bearing rollers 12 arranged on a phantom circle on the base chassis 1 where the circle is concentric with the magazine support post 10, and whereby the position of the magazine 3 is determined with respect to the direction of height. With the central tubular portion 39 fitting to the support post 10, the magazine is prevented from lateral deflection.

The magazine 3 is coupled to the motor M3, which is provided for rotating the magazine, by two double gears 310, 320 as shown in FIG. 5.

The double gear 320 has a pinion 330 meshing with the toothed ring 33 of the magazine 3 and a large gear, the outer peripheral portion of which is formed with two through holes 340, 340 diametrically opposed to each other.

The aforementioned sensor (count sensor) SE8 is provided on the base chassis 1 so as to partially cover the large gear of the double gear 320 from above and below for counting the number of times the hole 340 passes.

When the double gear 320 rotates a ½ turn, the magazine 3 rotates by 15 degrees, i.e., one pitch of grooves 31.

As shown in FIG. 5, a lever 37 movable about a pivot 37a over a specified range is mounted on the base chassis 1 close to the path of revolution of the contact plate 35 on the magazine 3. The lever 37 is biased by a spring 38 and has a free end positioned in the path of revolution of a protrusion 36 formed on the contact plate 35. The detecting switch SW5 is disposed in the path of movement of the lever 37. The position where the contact plate 35 is attached to the magazine 3 is so determined that when the lever 37 is pivotally moved by the contact of the free end with the protrusion 36 of the plate 35, actuating the switch SW5, No. 1 disc holding groove 31 of the magazine 3 will be opposed to the disc insertion-discharge means 4 to be described later.

Upon the No. 1 groove 31 reaching the position of the insertion-discharge means 4, one of the two holes 340, 340 formed in the magazine driving double gear 320 is at the position of the count sensor SE8.

When the switch SW5 for detecting the position of disc No. 1 and the count sensor SE8 have functioned at the same time, the No. 1 groove 31 as positioned for the insertion-discharge means 4 is detected.

When the ON-OFF button 22 on the front panel 2 is pressed, the magazine 3 is invariably rotated so as to bring the No. 1 groove 31 to the position opposed to the means 4, followed by the subsequent movement.

Disc Upper Portion Guide Member 5 (see FIGS. 1, 3 and 6 to 8):

A guide member 5 is provided over the magazine 3 for guiding the upper portion of the group of discs accommodated in the magazine 3.

The guide member 5 has a leg 50 at its center and legs 51 at its outer peripheral portions, the legs 50, 51 projecting downward. The leg 50 in the center is fitted to the upper portion of the support post 10 mounted on the chassis 1 and extending through the central tubular portion 39 of the magazine 3. The peripheral legs 51 are fitted to and supported by guide member support posts 11 projecting from the base chassis 1. The guide member 5 does not rotate.

Figure 7:
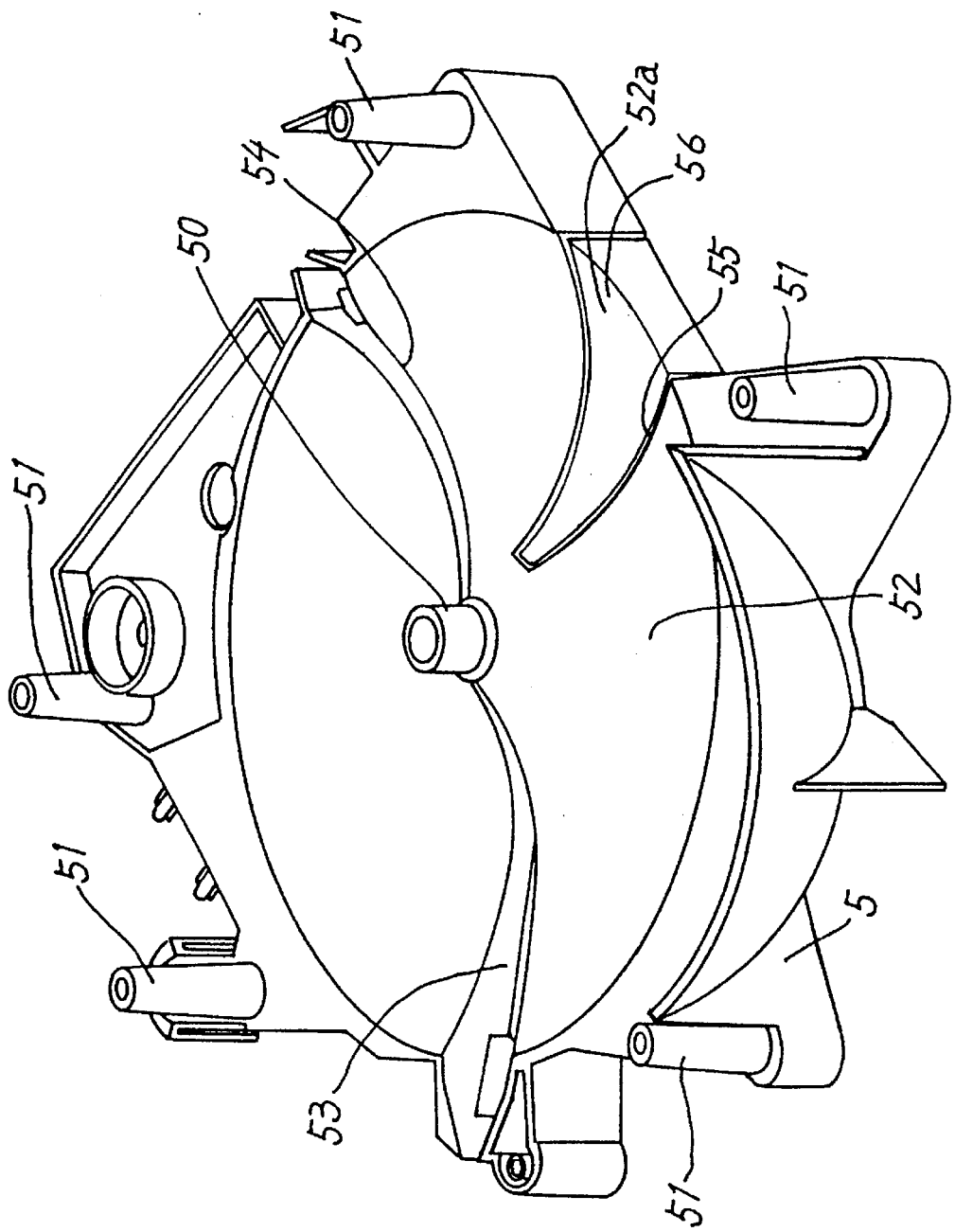
FIG. 7 is a perspective view of the bottom side of the guide member.

With reference to FIG. 7 which is a perspective view showing the guide member 5 turned upside down, the member 5 has an annular guide surface 52 in the form of a large circular-arc bottom surrounding the central leg 50. The curvature of the circular-arc guide surface 52 is approximately equal to the curvature of the outer periphery of the disc D.

As shown in FIG. 8, the guide surface 52 of the guide member 5 covers the disc D in the magazine 3 and is positioned close to the upper portion of the disc, so that the disc is unlikely to fall from the magazine even if the playing device is moved or turned upside down with the disc accommodated in the magazine.

Furthermore, the magazine 3 and the guide member 5 provide a two-component structure for holding the discs D, and only the magazine 3 is rotatable. This makes the magazine 3 compact and lightweight. The magazine 3 is therefore easy to control for rotation. Since the disc holding grooves 31 need to be formed only in the magazine 3, the grooves 31 are easy to make.

As shown in FIG. 7, the annular groove-like guide surface 52 of the guide member 5 has two guide grooves 53, 54 extending radially of the member 5 and spaced apart by the same angle as the angle between the insertion-discharge means 4 and the playing means 9, i.e., by 135 degrees about the central leg 50. Each of the guide grooves 53, 54 has an open end in the side edge of the guide member 5.

The guide grooves 53, 54 correspond to the respective positions of the insertion-discharge means 4 and the playing means 9, permitting delivery of the disc to the magazine 3 at each position.

The guide member 5 has a generally triangular cutout 55 extending from a peripheral portion thereof toward the central leg 50 and provided with a removable closure 56. The inner surface of the closure 56 serves as a guide surface 52a continuous with the guide surface 52.

When the closure 56 is removed, the discs can be taken out from the magazine 3 without removing the entire guide member 5. In repairing malfunctions of the playing device, this enables the repairman to promptly withdraw the discs, hand them over to the user and carry only the playing device to the repair shop, therein avoiding the possibility of lost discs.

Disc Insertion-Discharge Means 4 (see FIGS. 2, 6 and 12 to 17):

FIG. 12 shows a vertical slit 21 formed in the from panel 2 at its center for passing the disc therethrough.

Disposed in the rear of the slit 21 in the front panel 2 is a rotatable door 41 for opening or closing the slit. As seen in FIG. 2, provided in the rear of the door 41 is an insertion guide member 500, in the rear of which is provided the device 6 for delivering the disc to the magazine 3. These components provide the disc insertion-discharge means 4.

Figure 13:
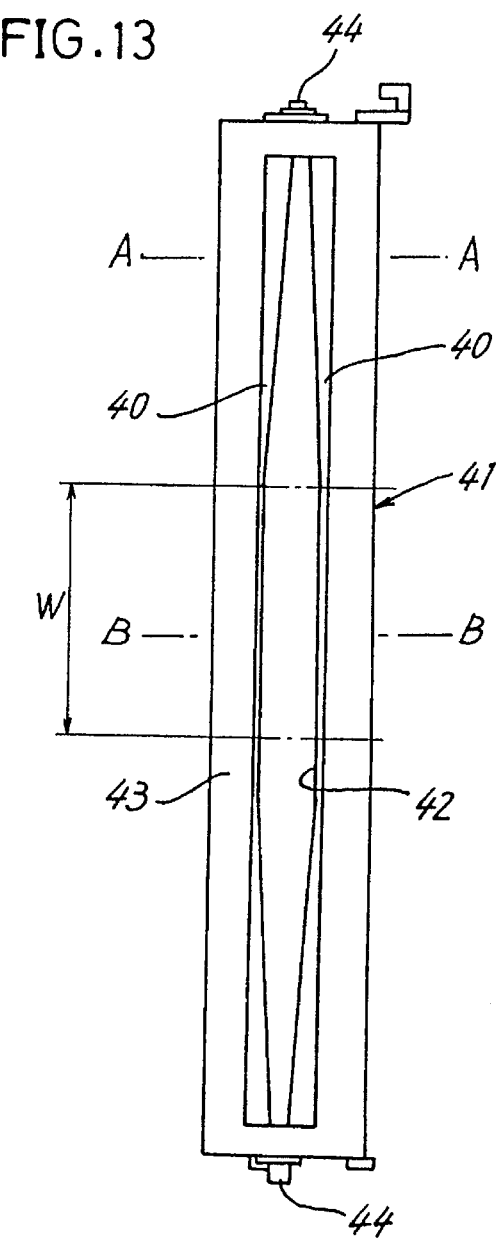
FIG. 13 is a front view of a rotatable door.

The rotatable door 41 is prepared from synthetic resin by injection molding, and is in the form of a vertically elongated hollow cylinder when seen from the front of the panel as shown in FIG. 13, and has two plate members 40, 40 in its center. A vertically elongated slit 42 for the disc to pass therethrough is formed between the plate members 40, 40.

In order to ease constriction of the door 41, the peripheral wall is omitted on the rear side.

The slit 42 has a length slightly greater than the diameter of the disc.

The slit 42 has a central portion of the largest width over a length of about 15 mm as indicated at W, is tapered from the central portion upward and downward and has upper and lower ends where the disc can be passed almost without any clearance.

Accordingly, even if the disc D passes through the slit 42 in frictional contact with the slit defining side walls, the contact occurs only at the peripheral edge portion of the disc, with the signal bearing portion of the disc held out of contact with the side walls and protected from damage.

The slit 21 in the from panel 2 and a disc insertion guide opening 510 of the insertion guide member 500 (to be described later) are also shaped like the slit 42 of the door 41 to hold the signal recorded area out of frictional contact with the side wall.

Figure 15:
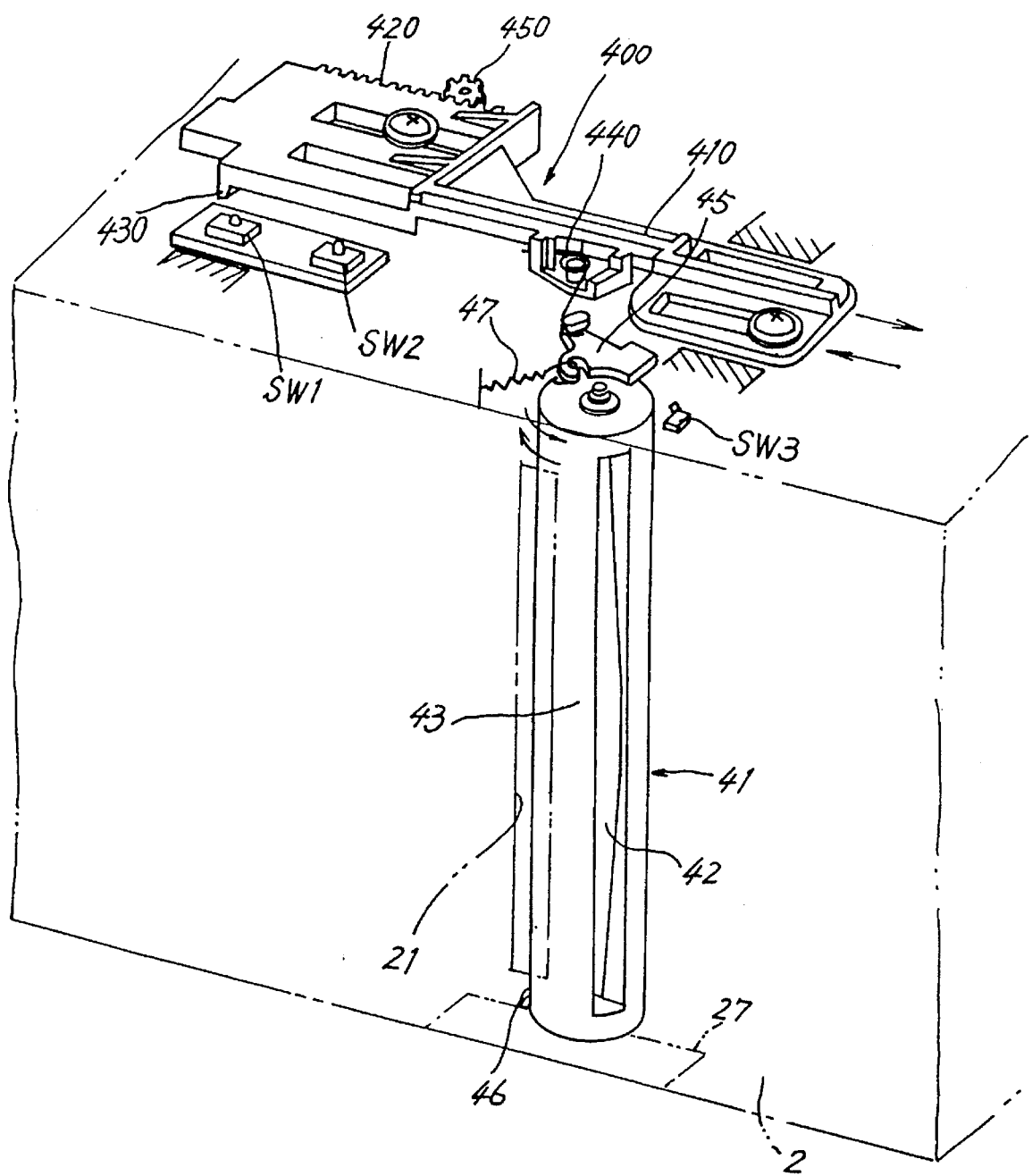
FIG. 15 is a perspective view of means for driving the rotatable door.

The rotatable door 41 has a pivot 44 projecting from the center of each of upper and lower end plates and rotatably supported by a rib (not shown) projecting from the rear side of the from panel 2. As shown in FIG. 15, the door has a circular-arc wall plate 43 which usually faces toward the slit 21 of the front panel 2 to close the slit 21. When the disc is to be inserted or discharged, the door is rotated clockwise through about 60 degrees by the door opening-closing drive device 400 (to be described later) to register the slit 42 with the slit 21 in the panel 2.

Figure 14A:
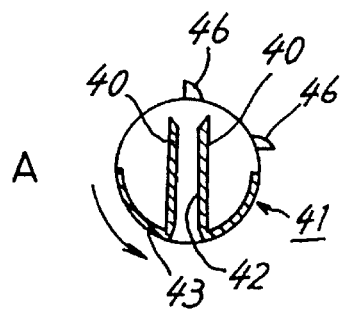
FIG. 14A is a view in section taken along the line A—A in FIG. 13 and showing the door.
Figure 14B:
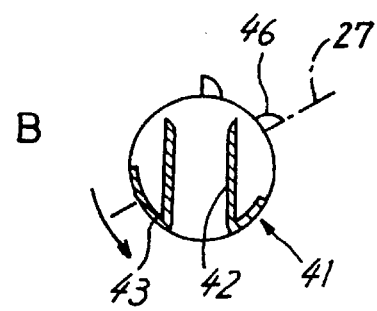
FIG. 14B is a view in section taken along the line B—B in FIG. 13 and showing the door.

As shown in FIG. 14B, the door 41 has stoppers 46, 46 projecting from the lower end thereof for regulating the angle of rotation of the door by coming into contact with a lug 27 on the from panel 2.

Figure 16:
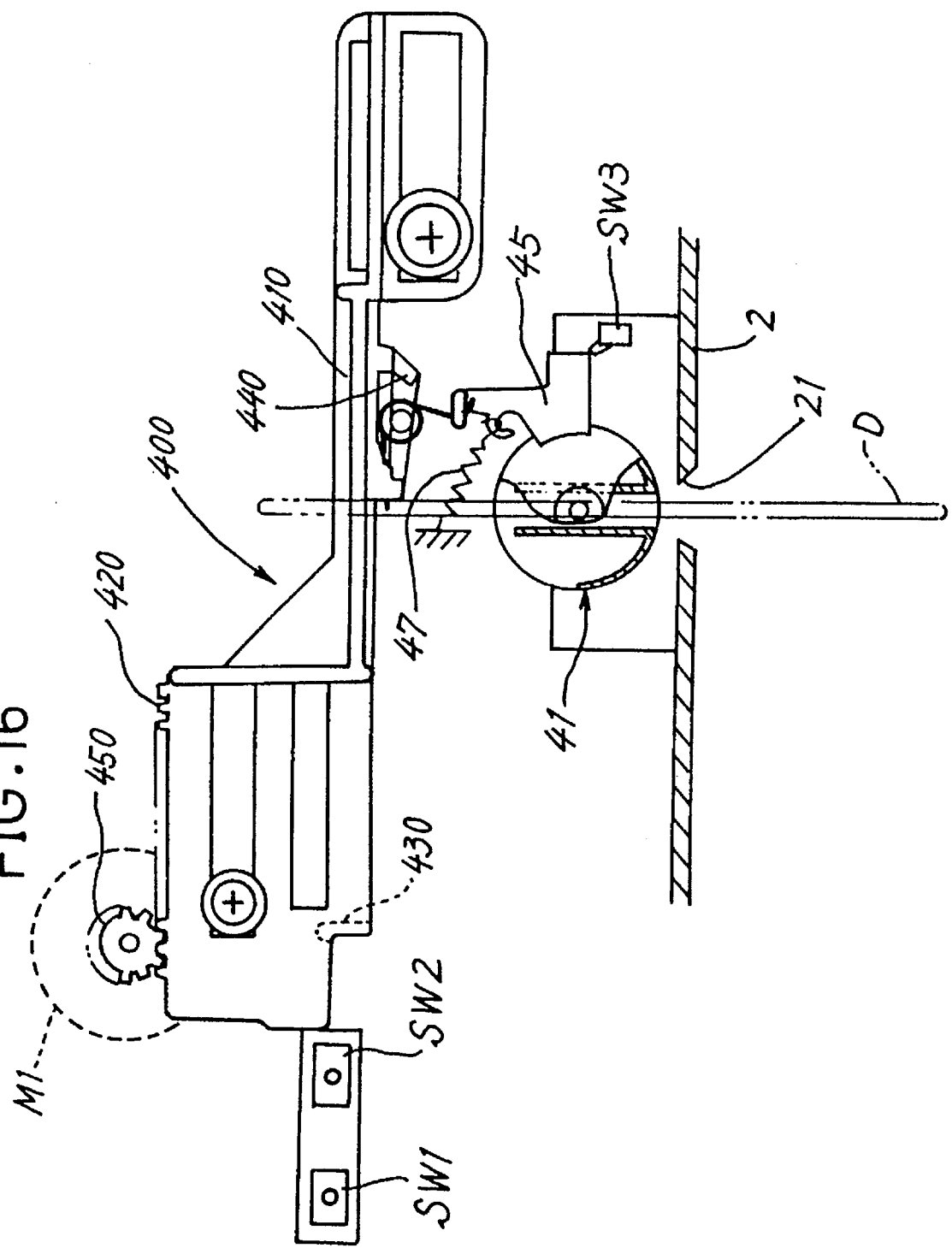
FIG. 16 is a plan view of the door driving means.

With reference to FIG. 16, a hook 45 extends from the upper end of the door 41 integrally therewith. Connected to the hook 45 are a spring 47 having a small force biasing the door in the closing direction at all times, and a door opening-closing drive device 400.

The drive device 400 comprises a torsion spring 440 attached to a slider 410 which is horizontally slidable along the front panel 2. The spring has one end engageable with the hook 45 on the door 41 in bearing contact therewith.

The slider 410 has a rack 420 extending in the sliding direction and meshing with a pinion 450.

Figure 6:
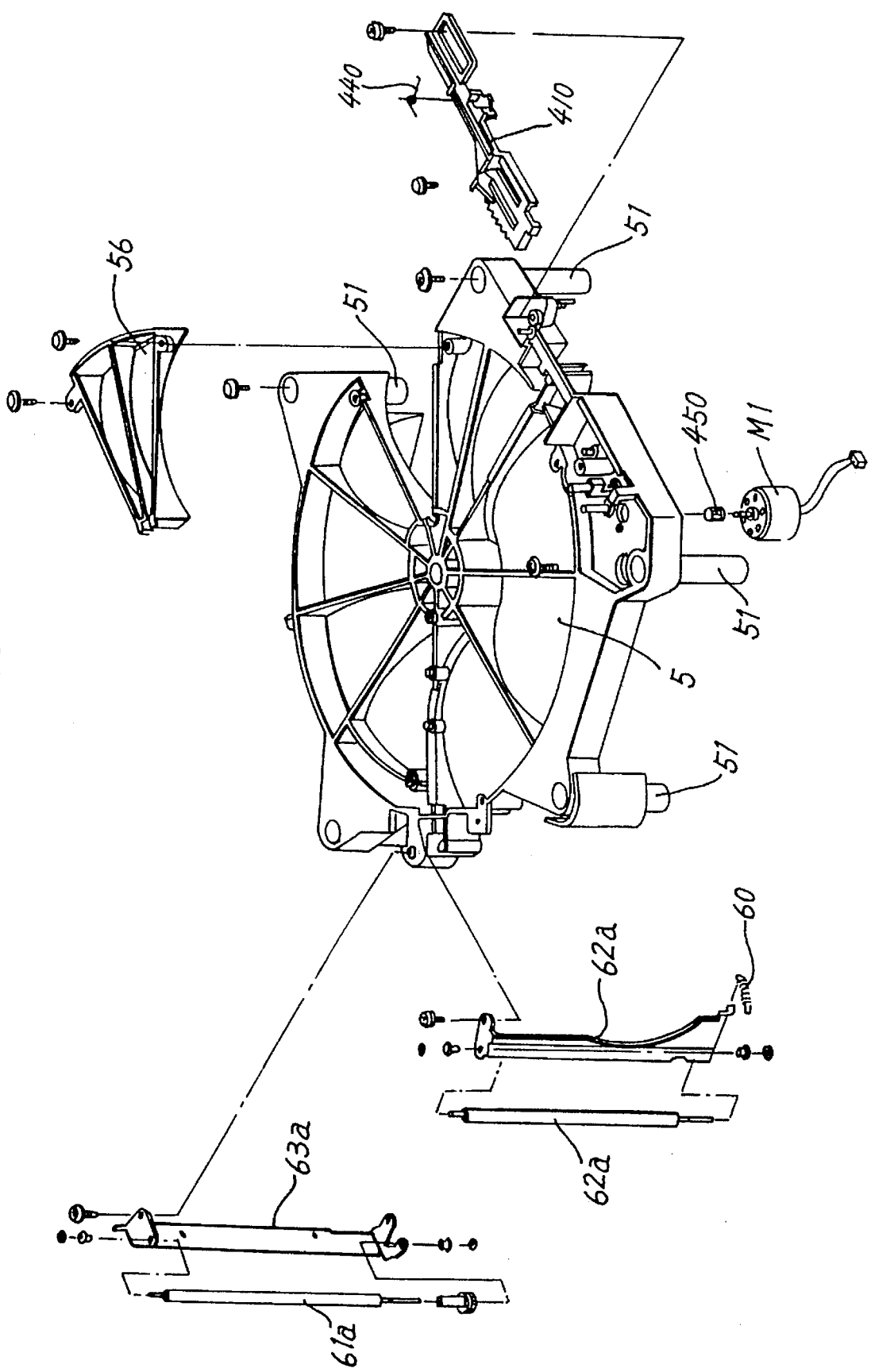
FIG. 6 is an exploded perspective view of a disc upper portion guide member.

As shown in FIG. 6, the slider 410 and the pinion 450 are arranged on the guide member 5. The motor Mi, which is provided for opening and closing the door, is mounted on the guide member 5 for driving the pinion 450 to move the slider 410.

When the slider 410 moves rightward in FIGS. 15 and 16, one end of the torsion spring 440 on the slider 410 comes into contact with the hook 45 on the door 41, rotating the door 41 clockwise, i.e., in the opening direction against the force of the spring 47 biasing the door 41 in the closing direction.

When the slider 410 moves leftward, the torsion spring 440 moves out of contact with the hook 45 on the door 41, fleeing the door 41 from its biasing force and permitting the spring 47 to rotate the door 41 in the closing direction, i.e., counterclockwise, for the door wall plate 43 to close the slit 21 in the front panel 2.

The switch (fully closed door sensor switch) SW1 and switch (fully open door sensor switch) SW2 are arranged along the path of movement of the slider 410. When the slider 410 is moved leftward where the door is fully closed, a projection 430 on the slider 410 actuates the fully closed door sensor switch SW1 to stop the door opening-closing motor Mi. Alternatively, when the slider 410 is moved to a position where the door is fully opened, the projection 430 actuates the fully open door sensor switch SW2 to stop the motor Mi.

As described above, the slider 410 and the rotatable door 41 are not interconnected by a rigid body, but the torsion spring 440 is provided for opening the door 41, and the spring 47 of lower force acts to close the door 41. Should the slider 410 move with the disc held in the door 41, causing the spring 47 to exert its force on the door 41 in the closing direction, the door 41 stops rotating with the disc engaged therein without breaking the disc since the spring force is small.

Further provided on the rear side of the front panel 2 is the switch (disc engagement sensor switch) SW3 which comes into contact with the hook 45 of the door 41 for detecting the door 41 as fully opened.

As stated above, the slider 410 and the door 41 are not interconnected by a rigid body, but are merely connected by the torsion spring 440, so that the slider 410 is likely to move in the door closing direction to actuate the fully closed door sensor switch SW1, with the disc engaged in the door 41. In view of this likelihood, the subsequent movement is not effected while the switch SW3 is detecting the door in the fully opened state to ensure improved safety.

Close to the door 41 in the rear thereof, the aforementioned insertion guide member 500 is fixedly provided to extend from the chassis 1 to the guide member 5.

Figure 17:
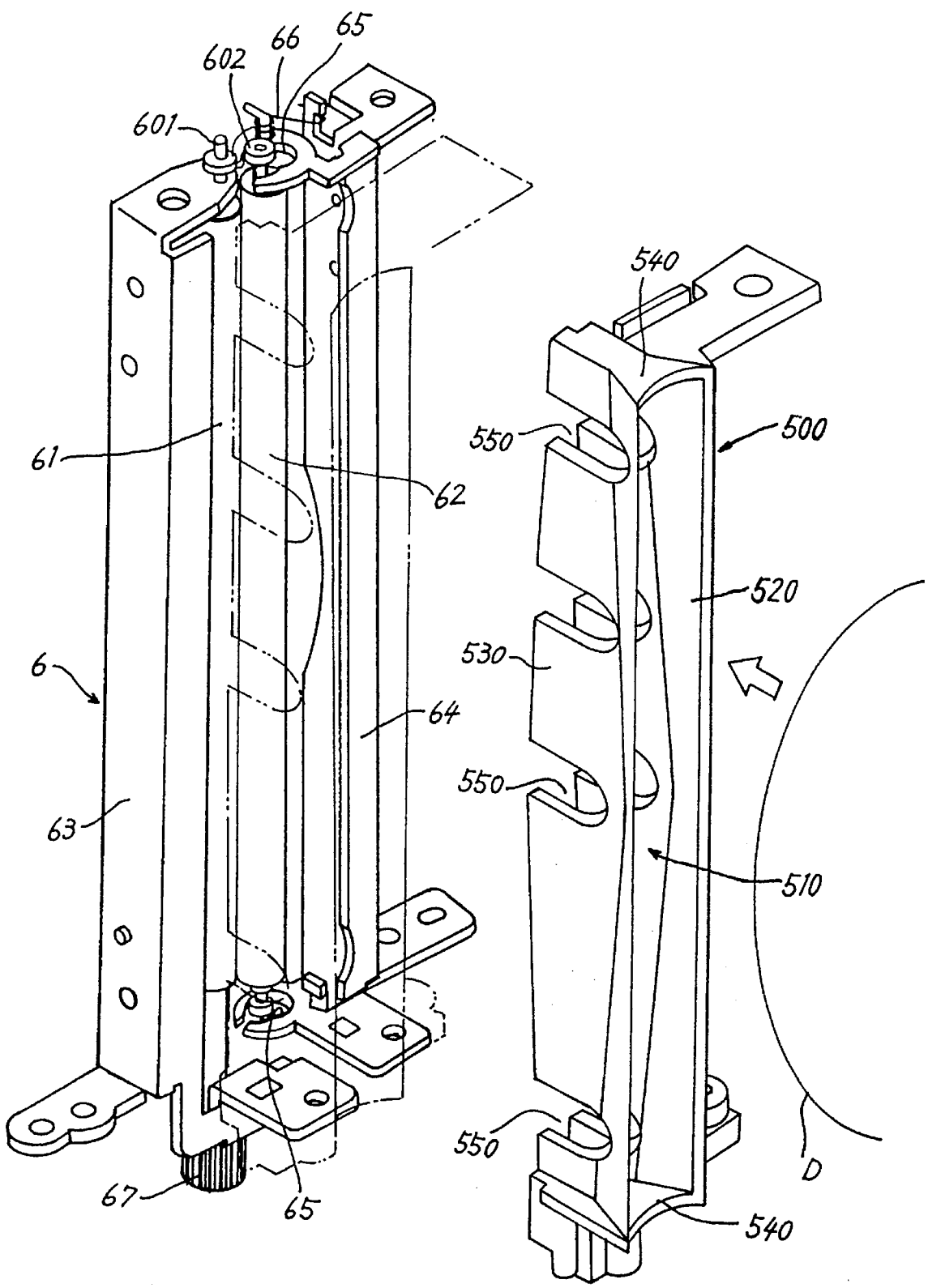
FIG. 17 is a perspective view of a disc delivery device.

As seen in FIG. 17, the insertion guide member 500 comprises two plates 520, 530 interconnected at each of their upper and lower ends by an end plate 540. Like the slit 21 in the door 41, the plates 520, 530 define therebetween a disc insertion guide opening 510 which is shaped not to contact the signal recorded area of the disc.

The plates 520, 530 are each formed with four cutouts 550 in opposed relation with the other. The cutouts are formed in corresponding relation with the respective positions of the first to fourth sensors SE1 to SE4 among the six sensors SE1 to SE6 for detecting the size of discs, permitting the passage of sensor beams therethrough.

Disc Delivery Device 6 (see FIGS. 2, 8 and 17 to 22):

The delivery device 6 is disposed behind the insertion guide member 500.

The device 6 comprises a pair of rollers 61, 62 arranged close to the member 500 for transporting the disc D as held therebetween, and a kick-out member 7 slidably provided on the base chassis 1 in the rear of the rollers 61, 62 shown in FIG. 8 for kicking out the disc D from the magazine 3 toward the rollers 61, 62.

As shown in FIG. 17, the two rollers 61, 62 have shafts 601, 602 projecting from their upper and lower ends and rotatably supported by support members 63, 64, respectively. The roller support members 63, 64 are fixedly provided and extend from the base chassis 1 to the guide member 5.

The left roller 61 shown in FIG. 17 is held in a fixed position where the roller contacts the surface of the disc passing through the center of width of the insertion guide opening 510 of the insertion guide member 500, and carries a drive gear 67 at its lower end.

The other roller 62 has its shaft 602 loosely fitted in a cutout 65 in each end of the support member 64 so as to be movable toward or away from the roller 61 of the pair, and is biased toward the roller 61 by a spring 66 into contact with the roller 61 at all times.

The cutout 65 of the roller support member 64 has a side opening with a width which is smaller than the diameter of the shaft 602, preventing the roller shaft 602 from slipping off.

Figure 18:
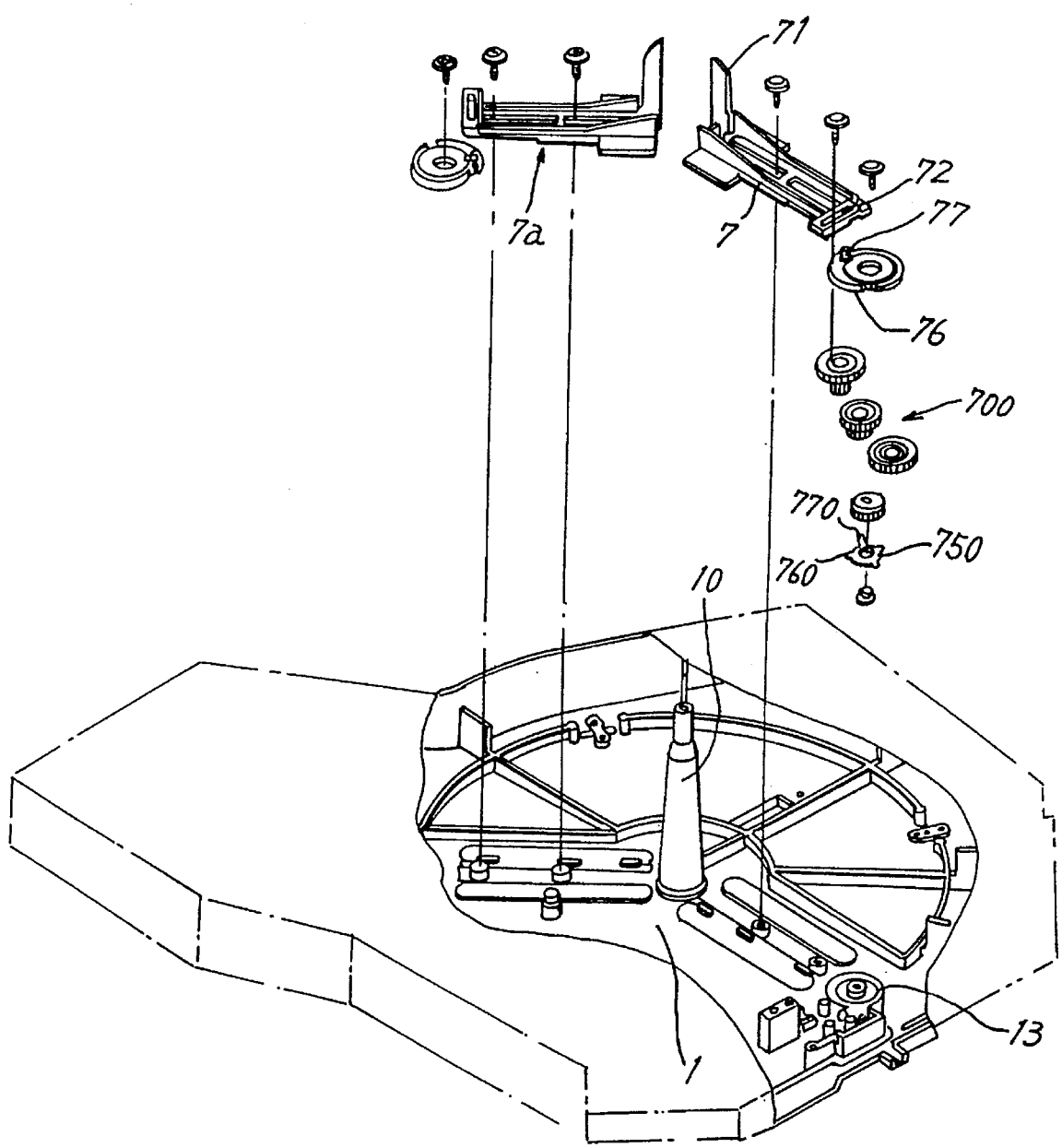
FIG. 18 is a perspective view of the base chassis and kick-out members.

With reference to FIG. 18, the kick-out member 7 is provided on the base chassis 1 and slidable from the support post side toward the position between the rollers 61, 62. The kick out member 7 has a pushing piece 71 projecting upward from its rear end and movable into the bottom slit 32 of the magazine 3 to kick out the disc toward the rollers 61, 62, and a guide slot 72 formed in its front portion and orthogonal to the direction of sliding movement of the member 7.

The roller 61 which is fixed in position and the kickout member 7 has a common drive device 705 coupled thereto.

Figure 19:
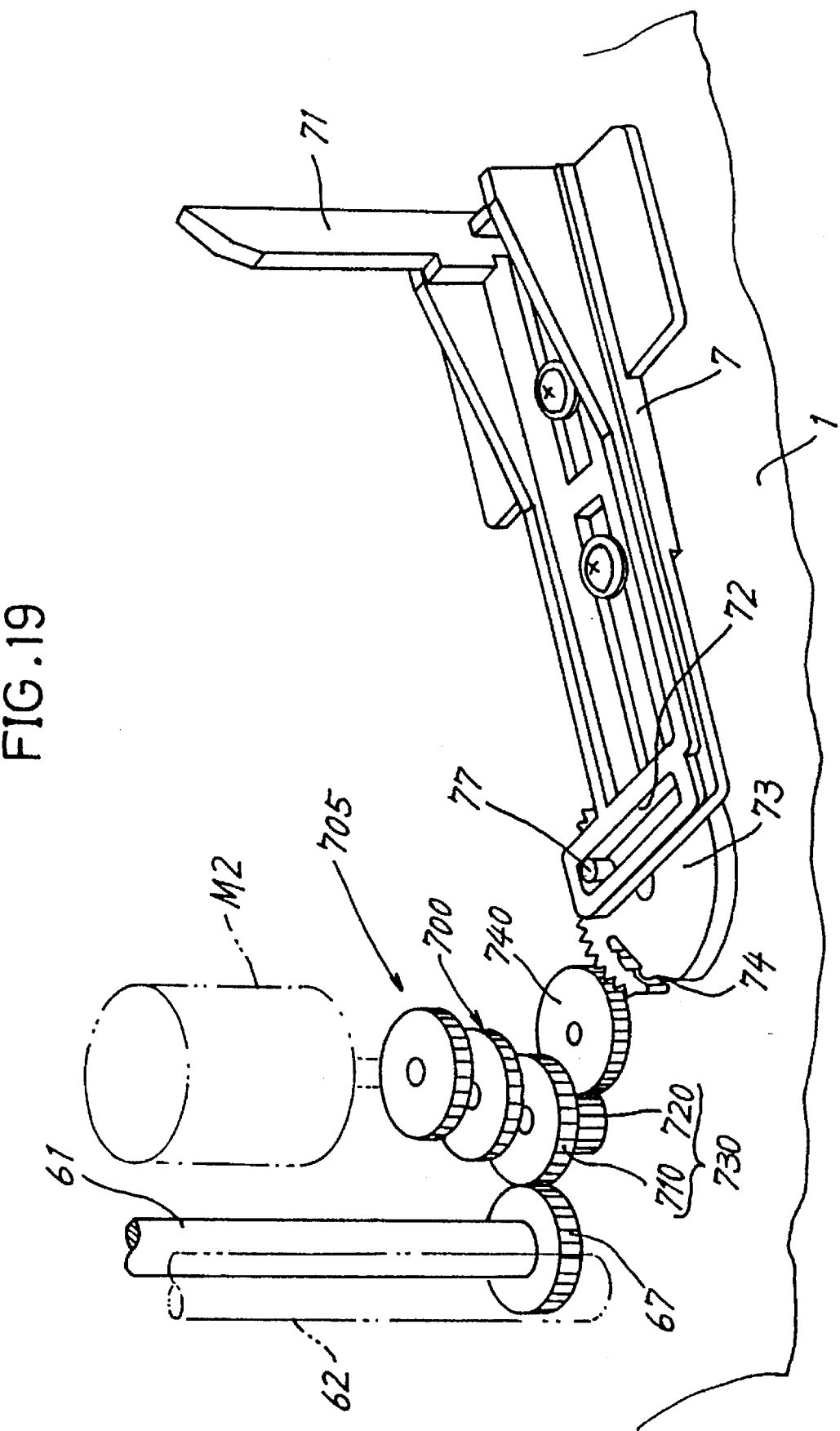
FIG. 19 is a perspective view of a system for driving a slide member.

With reference to FIG. 19, the drive device 705 comprises the aforementioned motor M2 which is an insertion-discharge side loading motor mounted on the base chassis 1, and a gear train 700 coupled to the motor M2 and including a double gear 730 at a downstream position of the train. The double gear 730 has a large gear 710 meshing with the gear 67 at the lower end of the roller 61, and a small gear 720 in mesh with an intermediate gear 740, which in turn is in mesh with a control gear 73. A pin 77 projecting from the control gear 73 is slidably fitted in the guide slot 72 of the kick-out member 7. The gears of the drive device 705 and the gears included in the mechanisms of the present embodiments are all made of synthetic resin.

Figure 20:
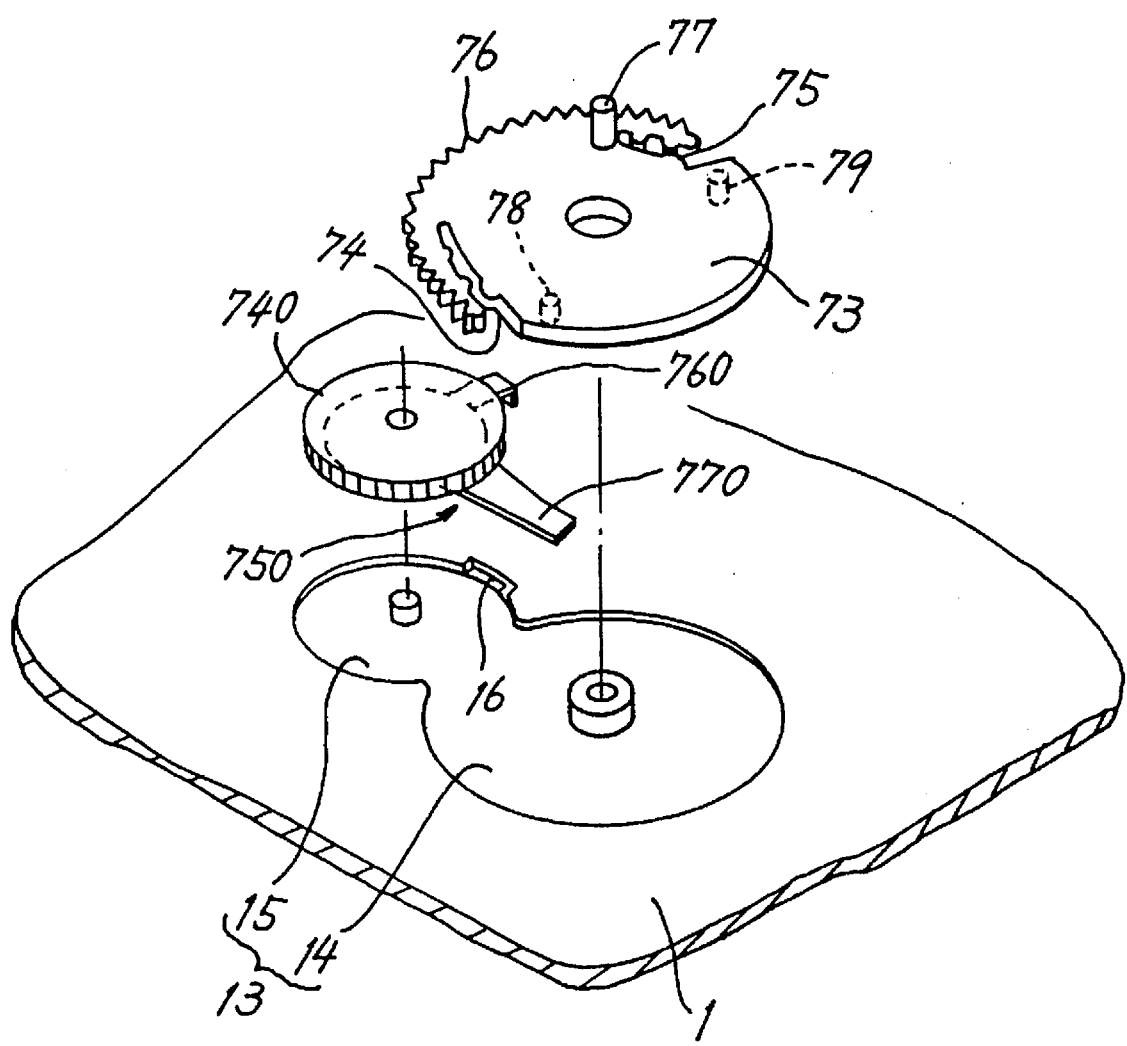
FIG. 20 is an exploded fragmentary perspective view of the slide member driving system.

As seen in FIG. 20, the intermediate gear 740 and the control gear 73 are rotatably fitted in a cavity 13 formed in the base chassis 1. The cavity 13 comprises a small circular recess 15 having the intermediate gear 740 fitted therein, and a large circular recess 14 continuous with and partially lapped over the recess 15 for the control gear 73 to fit in.

Attached to the underside of the intermediate gear 740 is a latch plate 750 rotatable with the gear 740 when free of load or slipping relative to the gear 740 when subjected to a load.

A rotation restraining lug 760 having a downwardly bent outer end and an arm 770 laterally extend in a V-shaped arrangement from the outer periphery of the latch plate 750.

The small circular recess 15 formed in the base chassis 1 and having the intermediate gear 740 fitted therein is provided with an arcuate aperture 16 having the bent end of the restraining lug 760 fitted therein loosely. The lug 760 is revolvable by an amount corresponding to an allowance included in the aperture.

The arm 770 is positioned inside the large circular recess 14 having the control gear 73 fitted therein.

The control gear 73 has a toothed portion 76 along part of its periphery and cutouts 74, 75 extending from opposite ends of the toothed portion 76 along this portion 76 toward each other to give resiliency to opposite sides of the toothed portion 76.

The pin 77 fitting in the guide slot 72 of the kick-out member 7 is provided on the upper side of the control gear 73, the underside of which is provided with contact pieces 78, 79 close to the outer periphery of the gear and to the respective cutouts 74, 75.

Figure 21:
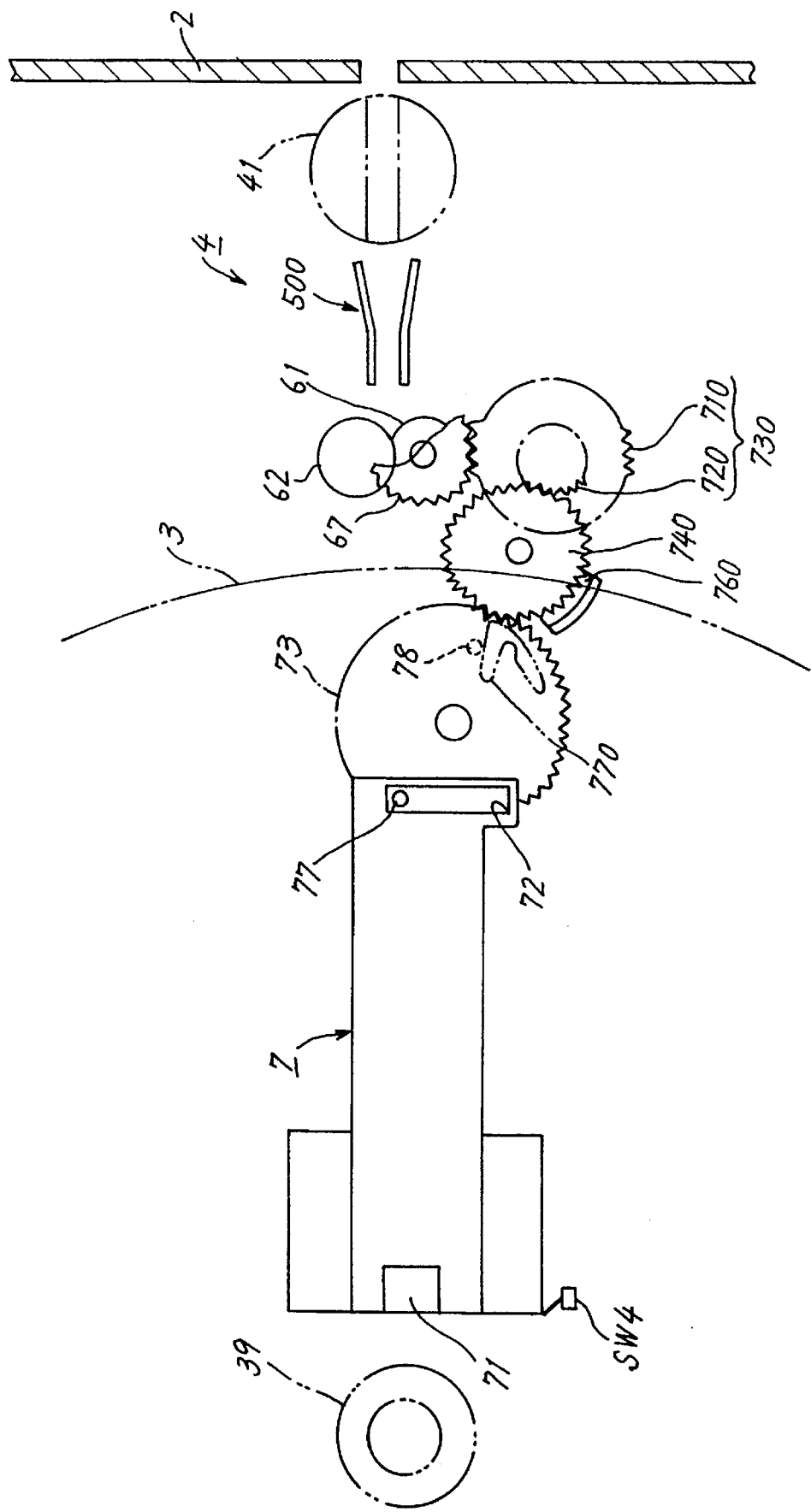
FIG. 21 is a plan view of the driving system.

With reference to FIGS. 19 and 21, the insertion-discharge side loading motor M2 operates when the disc is to be accommodated in the magazine 3, rotating the double gear 73 in a direction to draw the disc inward.

The intermediate gear 740 meshing with the small gear 720 of the double gear 730 rotates counterclockwise to rotate the control gear 73 clockwise and move the kick-out member 7 rearward. (FIG. 21 shows the kick-out member in a retracted position.)

The latch plate 750 beneath the intermediate gear 74 rotates to follow the counterclockwise rotation of the intermediate gear 740 until the bent end of the rotation restraining lug 760 strikes on an end of the arcuate apertured portion 16, whereupon the intermediate gear 740 only further rotates.

With the retraction of the kick-out member 7, the pushing piece 71 on the member 7 moves out from the disc holding groove 31 of the magazine 3, rendering the disc insertable into the holding groove 31 free of trouble.

After the kick-out member 7 has reached the limit position of its retraction, the double gear 730 continues to rotate, causing the fixed roller 61 to rotate continuously to continuously draw the disc inward. The loading motor M2 stops a predetermined period of time after the passage of the disc over the roller 61 by the disc sensors SE1 to SE6 to be described later, i.e., 0.5 seconds thereafter in the case of the present embodiment. As shown in FIG. 8, the disc reaches the inner-portion of the holding groove 31 of the magazine 3 upon moving past the rollers 61, 62, such that the disc falls into the groove 31 the moment it leaves the rollers 61, 62.

With reference to FIG. 8, the distance A the disc rolls along under gravity is greater than the distance B between the disc falling into the groove 31 and the roller 61.

Although the intermediate gear 740 continues rotating while the double gear 730 is in rotation, the cutout 74 of the control gear 73 is opposed to the intermediate gear 740 upon the kick-out member 7 reaching its retracted limit position as shown in FIGS. 19 and 20, permitting the intermediate gear 740 to rotate idly without delivering its torque to the gear 73. This obviates the possibility of damage to the mechanism.

Figure 22:
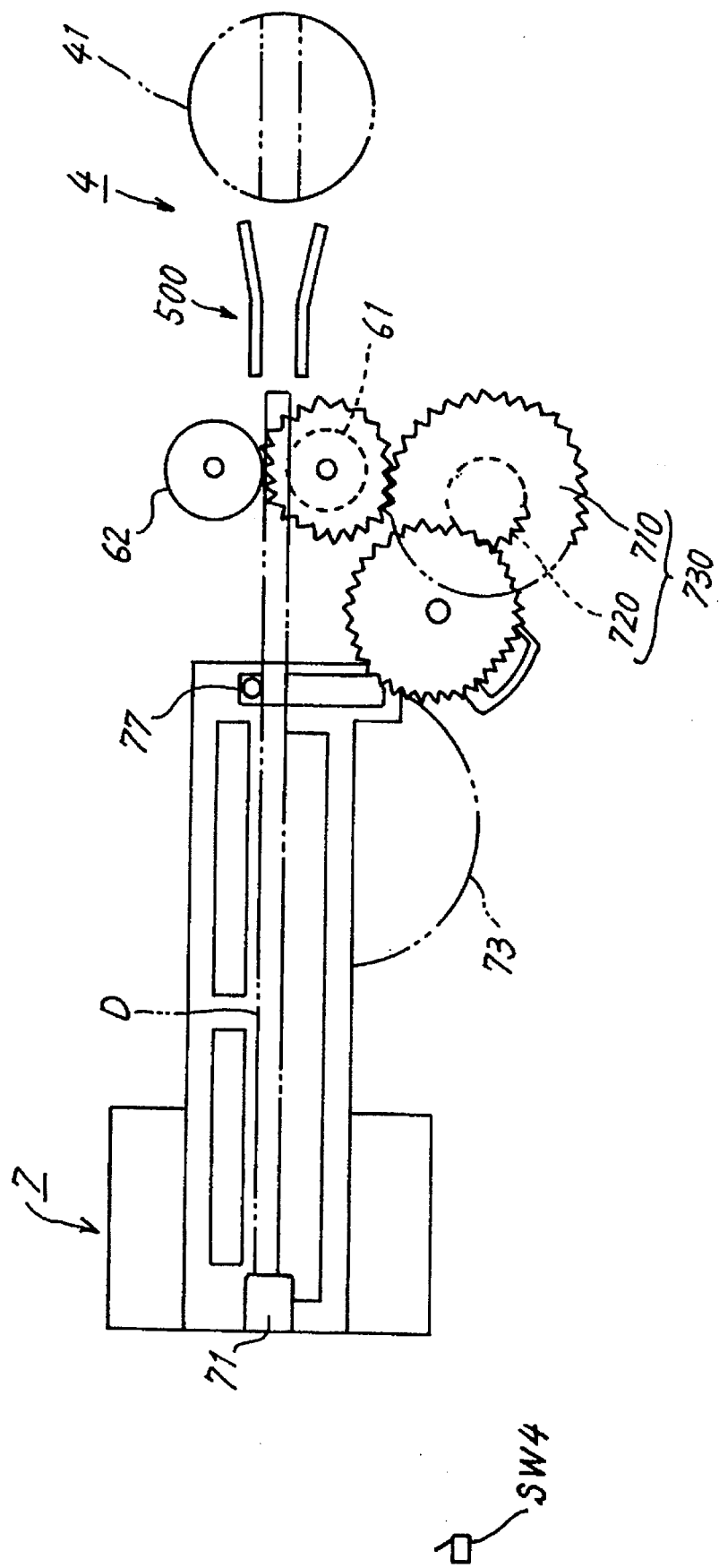
FIG. 22 is a plan view showing the driving system in operation.

When the disc is to be discharged from the magazine 3 toward the rollers 61, 62, the insertion discharge loading motor M2 rotates in a direction opposite to the above, rotating the double gear 730 counterclockwise to rotate the rollers 61, 62 in such direction as to discharge the disc as shown in FIG. 22.

The intermediate gear 740 rotates clockwise along with the latch plate 750, causing the arm 770 to kick the contact piece 78 on the underside of the control gear 73 to rotate the gear 73 counterclockwise slightly.

The slight counterclockwise rotation of the control gear 73 meshes the toothed portion 76 of the gear 73 with the intermediate gear 740, which in turn drives the control gear 73 counterclockwise.

Although the latch plate 750 beneath the intermediate gear 740 rotates, following the clockwise rotation of the gear 740, the plate stops rotating upon the bent end of the rotation restraining 760 coming into contact with the end of the arcuate apertured portion 16. The intermediate gear 740 continues rotating.

Figure 35:
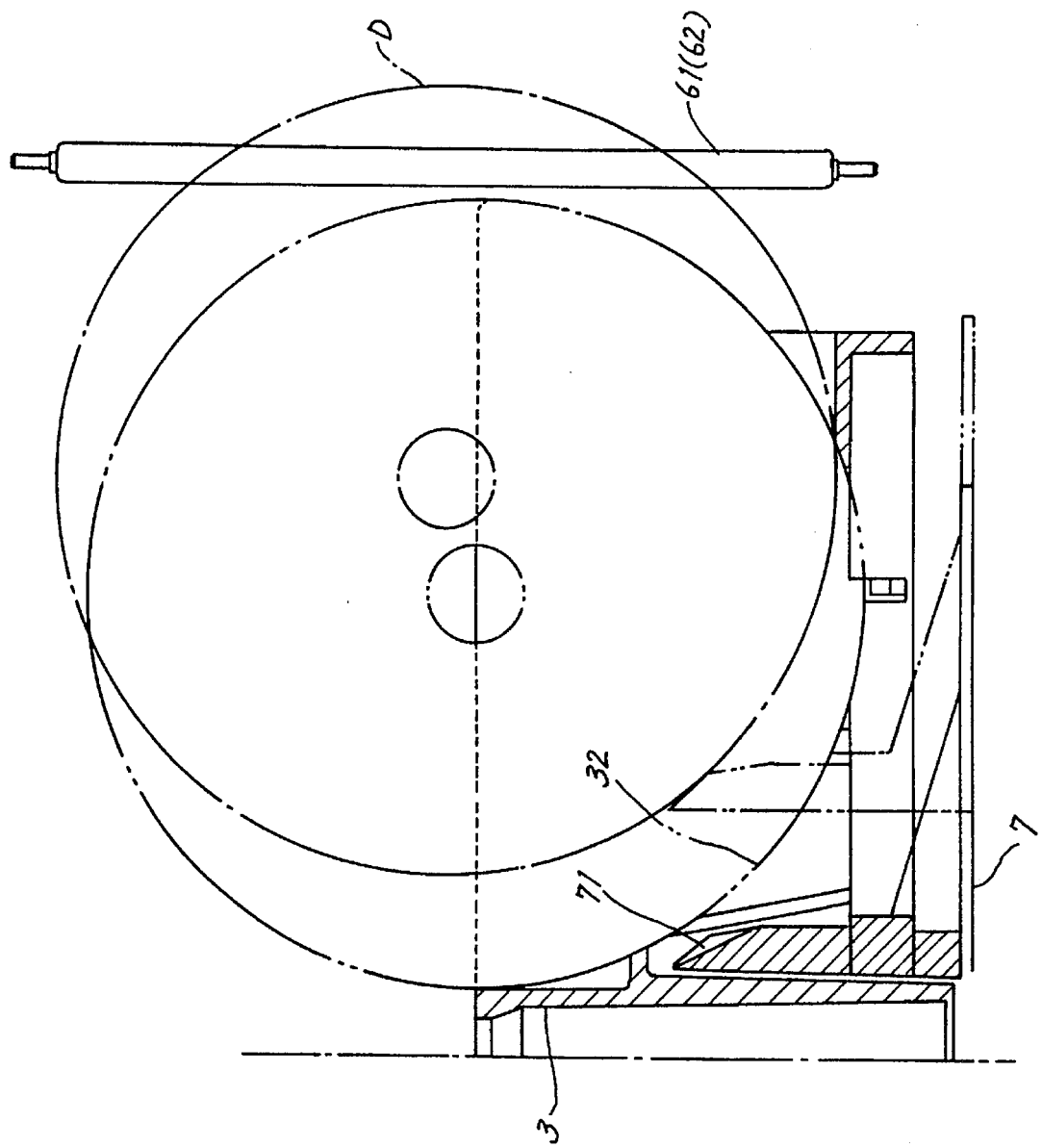
FIG. 35 is a sectional view showing the disc as kicked out by the kick-out member.
Figure 36:
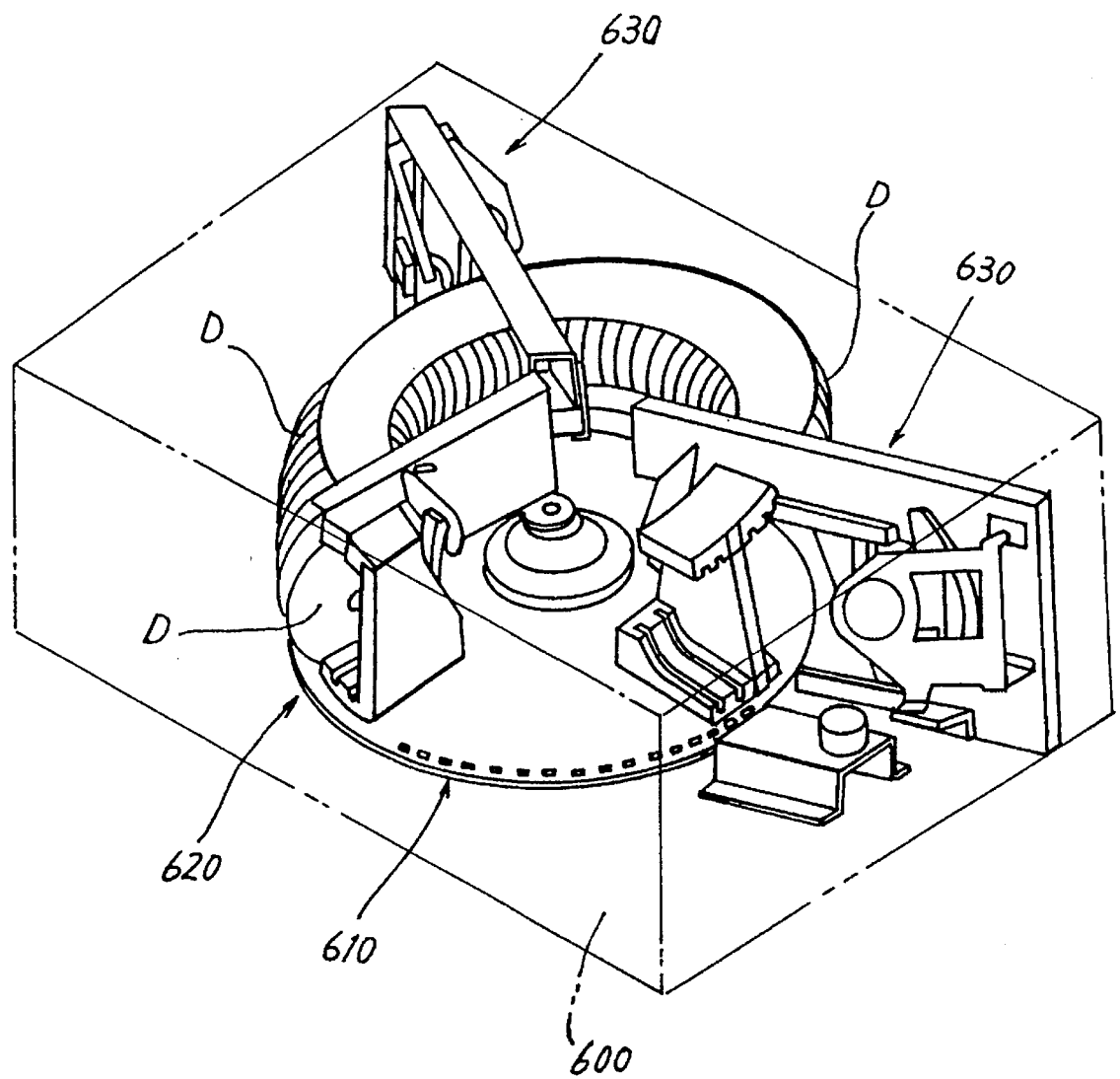
FIG. 36 is a perspective view of a conventional device.
Figure 37:
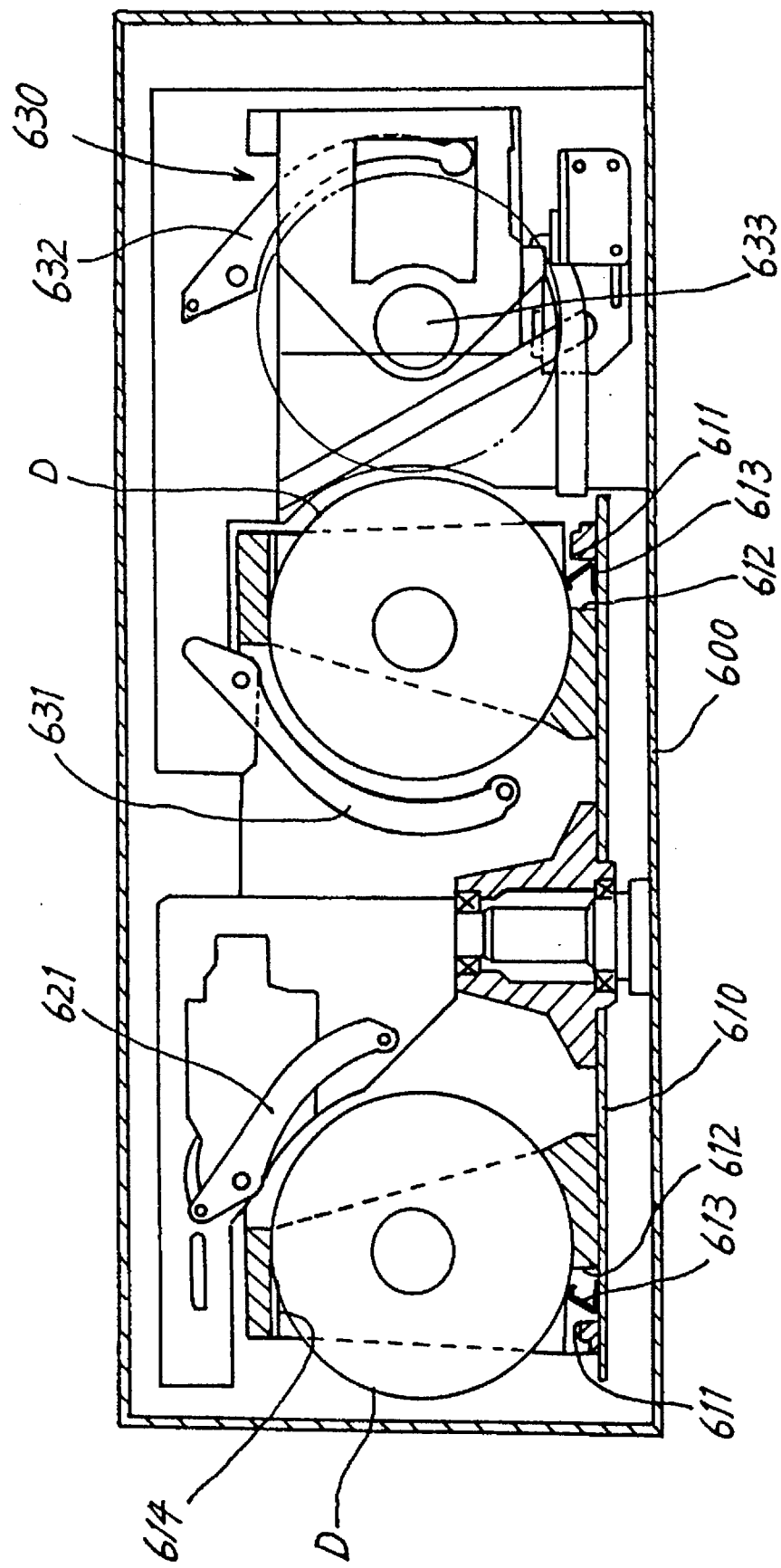
FIG. 37 is a sectional view of the conventional device.

The counterclockwise rotation of the control gear advances the kick-out member 7, moving the pushing piece 71 into the bottom slit 32 of the magazine 3 to kick out the disc in the groove 31 until the disc is nipped by the rollers 61, 62. (FIG. 22 shows the kickout member 7 in a kickout completed position, while FIG. 35 shows the path of movement of the disc D.)

Upon the delivery of the disc to the rollers 61, 62 by the action of the kick-out member 7, the cutout 75 of the control gear 73 is opposed to the intermediate gear 740, whereby the rotation of the control gear 73 is discontinued. The intermediate gear 740, although continuously rotating, causes no damage to the mechanism.

When the disc D has moved past the rollers 61, 62, the disc sensors to be described later function to stop the loading motor M2.

When the disc is to be accommodated in the magazine 3 again, the loading motor M2 operates to rotate the double gear 730 clockwise and rotate the roller 61 in the disc drawing-in direction.

The intermediate gear 740 meshing with the small gear 720 of the double gear 730 rotates counterclockwise. At this time, the latch plate 750 rotating counterclockwise with the intermediate gear 740 kicks the contact piece 79 on the underside of the control gear 73 with its arm 770, slightly rotating the control gear 73 clockwise to mesh the toothed portion 76 of the gear 73 with the intermediate gear 740.

The same operation as described above thereafter follows.

The switch SW4 for detecting the retracted position of the kick-out member 7 is provided for the insertion-discharge side in corresponding relation with the retracted position of the member 7. While the kick-out member 7 in its retracted position is not detected by the switch SW4, the magazine rotating motor M3 remains unenergized. This prevents the rotation of the magazine 3 with the pushing piece 71 of the kick-out member 7 fitting in the slit 32 of the magazine as shown in FIG. 35.

Figure 9:
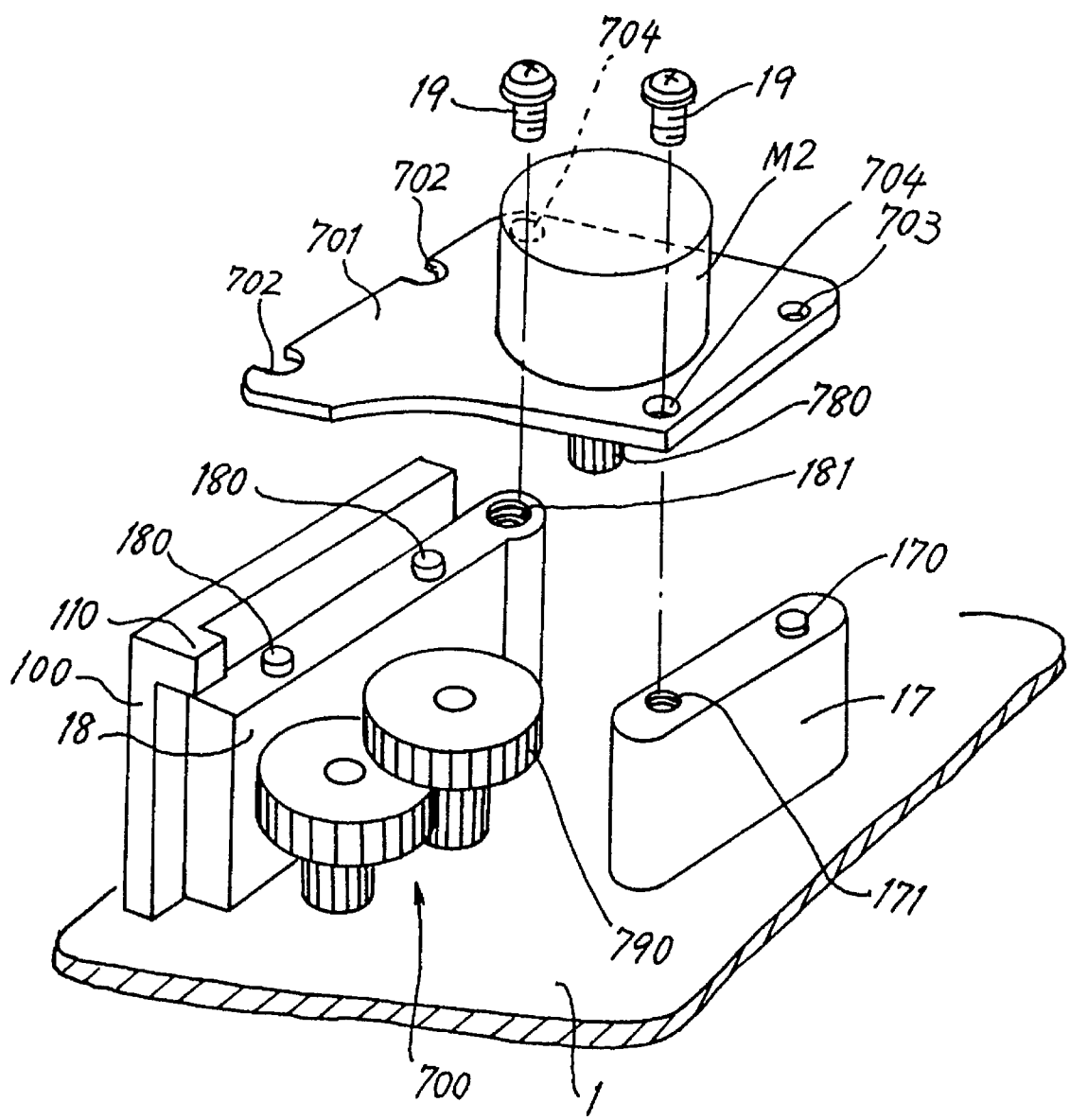
FIG. 9 is an exploded perspective view of a motor mount portion.
Figure 10:
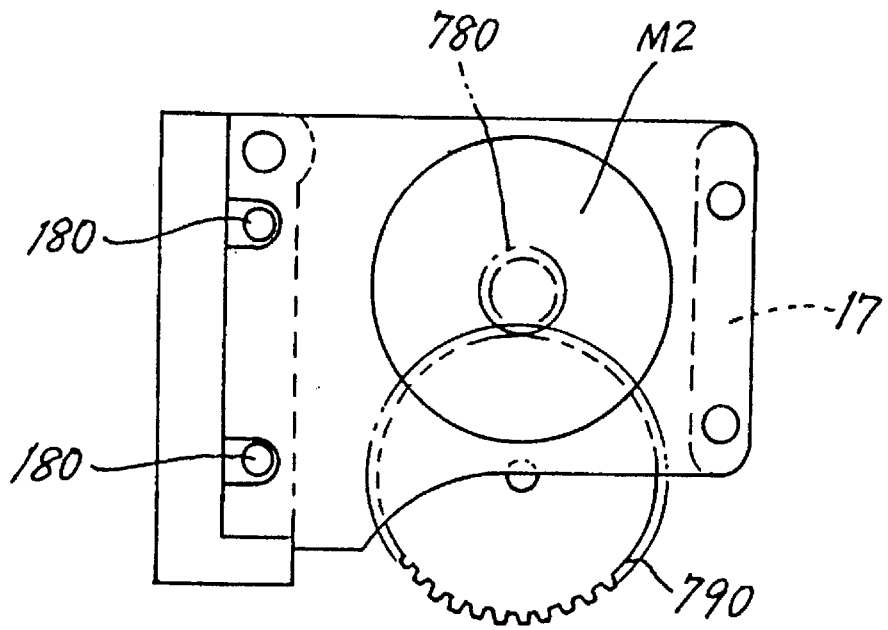
FIG. 10 is a plan view of the motor mount portion.

Motor Mounting Structure (FIGS. 9 to 11):

The insertion-discharge side loading motor M2 is mounted on a plate 701, which is fastened to a support plate 18 provided inside a side wall 100 of the base chassis 1 and to a boss 17 provided on the chassis 1, with screws 19.

A gear 780 fixed to the motor shaft extends downward through the plate 701.

The plate 701 is formed with positioning cutouts 702, 702, 703 and screw holes 704, 704.

The support plate 18 and the boss 17 on the base chassis 1 are provided with projections 180, 180, 170 fittable respectively in the cutouts 702, 702, 703 of the plate 701 when the motor shaft gear 780 is in mesh with a gear 790 at an upstream end of the gear train 700. The plate 18 and the boss 17 have screw bores 181, 171 corresponding to the screw holes 704, 704.

Projecting from the side wall 100 of the base chassis I is an interference piece 110 which interferes with the plate 701 when the plate 701 is to be positioned for the projections 180, 180 and the screw bores 171, 181 immediately from thereabove.

The upper ends of the projections 180 are vertically spaced from the lower surface of the interference piece 110 by a distance greater than the thickness of the plate 701.

Figure 11:
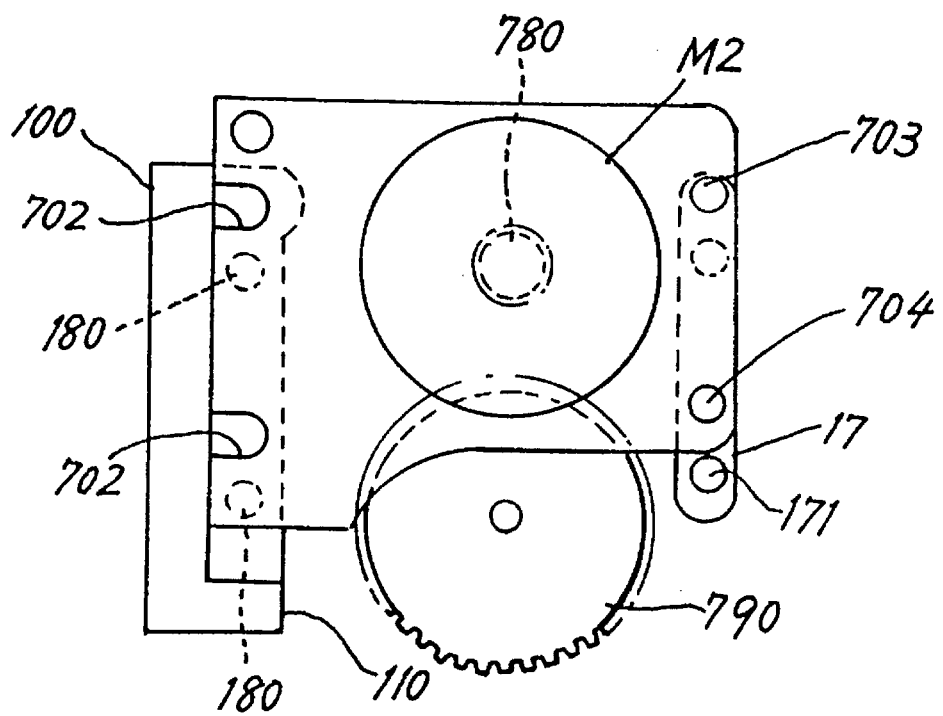
FIG. 11 is a plan view showing a motor before it is mounted in place.

Accordingly, to fix the plate 701 carrying the loading motor M2 and the gear 780 to the base chassis 1, the plate 701 must be positioned as placed under the interference piece 110 sideways to clear the piece 110 as illustrated in FIG. 11, with the result that the motor gear 780 is brought into meshing engagement with the gear 790 sideways. This obviates the possibility of damage to some teeth that would occur if the gear 780 is brought into striking contact with the gear 790 from above.

The motor mounting structure is used for mounting the other motors included in the present embodiment.

Figure 23:
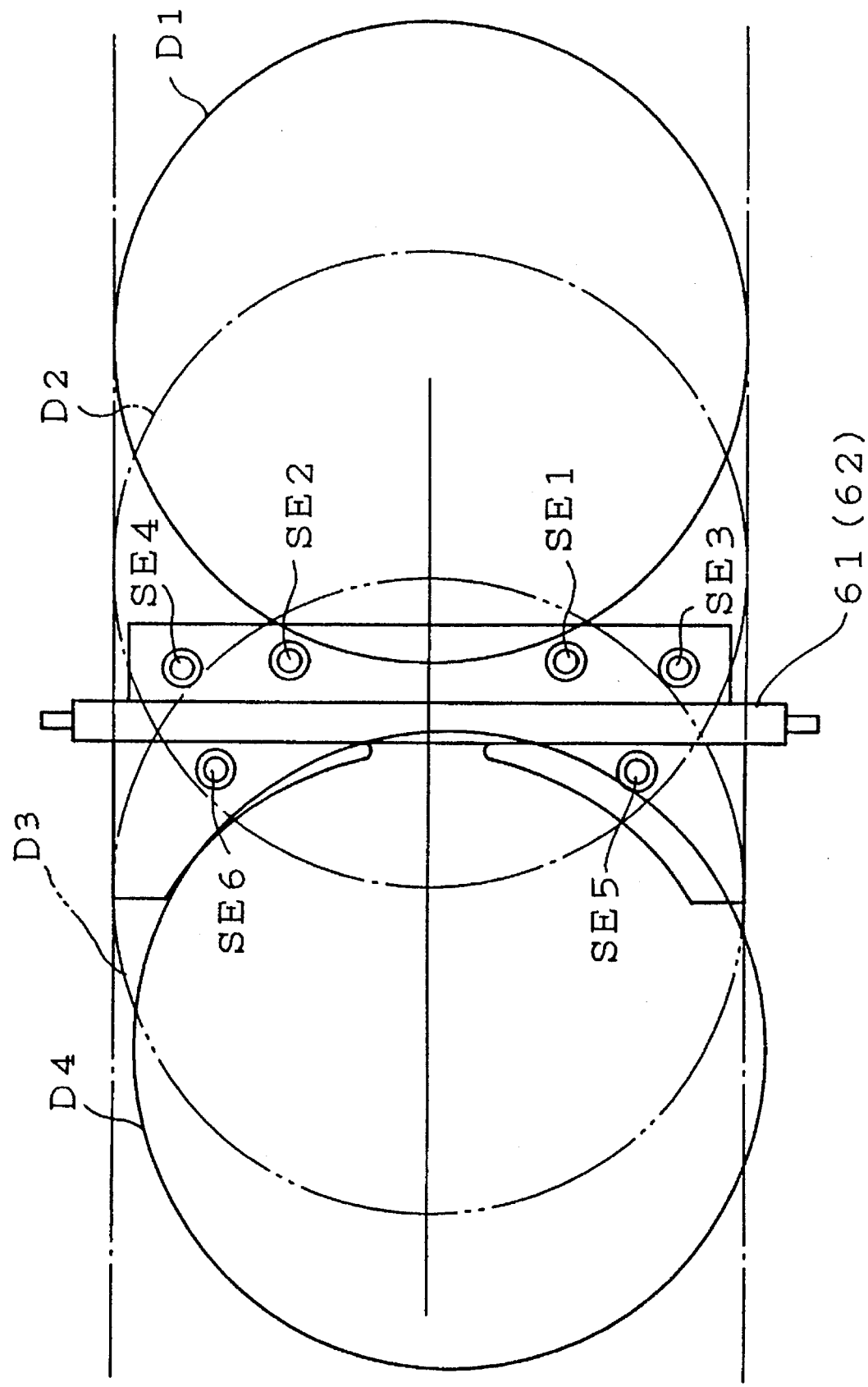
FIG. 23 is a view for illustrating an arrangement for detecting a 12-cm disc.

Detection of Disc (FIGS. 23 and 24):

As shown in FIG. 23, the disc insertion discharge means 4 is provided with the six sensors SE1, SE2, SE3, SE4, SE5 and SE6 for detecting the size and passage of discs. Each of the sensors comprises a light-emitting element and a light-receiving element which are arranged on opposite sides of the path of movement of the disc and opposed to each other.

On the outer side of the rollers 61, 62, first to fourth sensors SE1 to SE4 are arranged in a vertical row. On the inner side of the rollers 61, 62, fifth sensor SE5 and sixth sensor SE6 are arranged.

Figure 24:
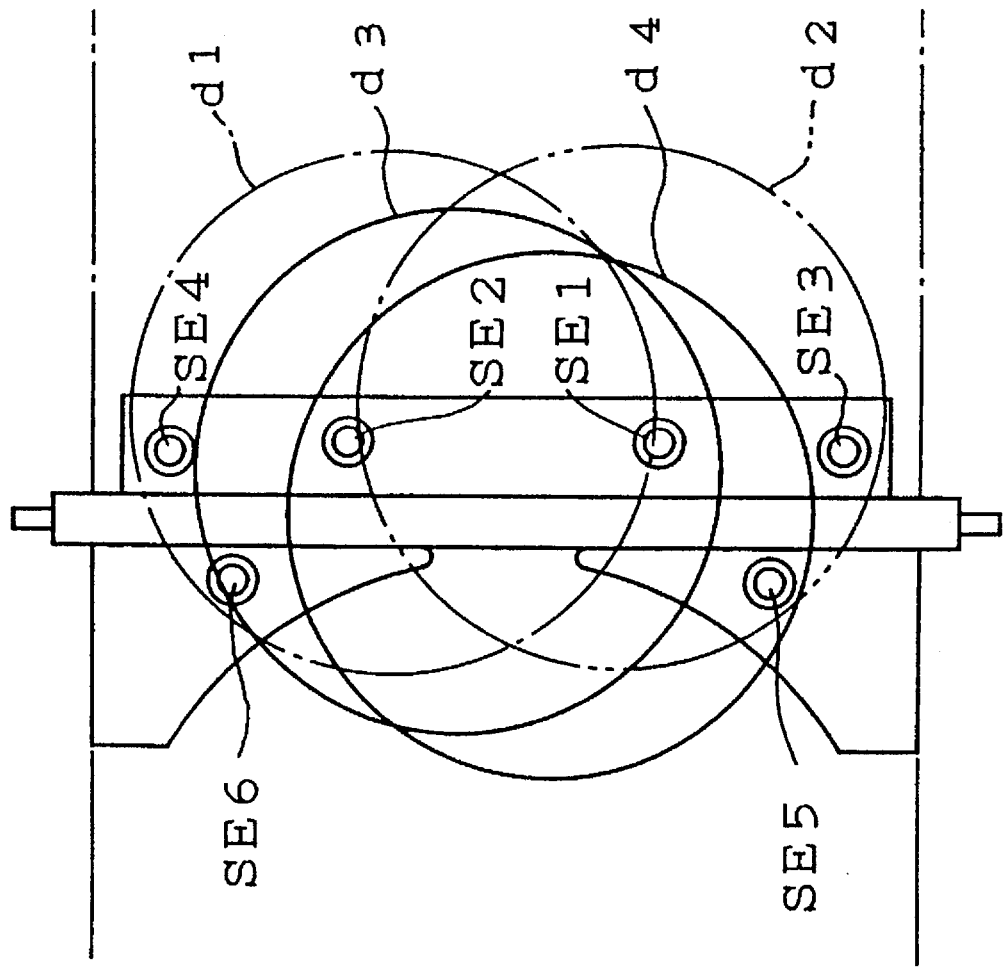
FIG. 24 is a view for illustrating an arrangement for detecting an 8-cm disc.

The first sensor SE1 is located at a position where the center of the 12-cm disc passes, the second sensor SE2 at a position slightly outward from the upper portion of the 8-cm disc d3 when the disc passes through the lower portion of path of movement as seen in FIG. 24, the third sensor SE3 at a position where the passage of the lower ends of discs is detected, and the fourth sensor SE4 at a position where the upper portion of the 12-cm disc is detected. The fifth sensor SE5 is positioned between the first sensor SE1 and the third sensor SE3, and the sixth sensor SE6 is positioned between the second sensor SE2 and the fourth sensor SE4, the fifth sensor SE5 and the sixth sensor SE6 being so positioned that when the 8-cm disc passes approximately through the mid-portion of the path of travel of the 12-cm disc, at least one of the fifth sensor SE5 and the sixth sensor SE6 is able to detect the disc.

In the following description of operation, the sensors SE1 to SE6 turn on upon transmission of light.

*When disc is inserted:

The user causes the disc to be nipped between the rollers 61, 62.

Procedure for detecting 12-cm disc:

(1) The first sensor SE1, which is on, turns off, and the loading motor M2 rotates to rotate the rollers 61, 62 as described above and draw the disc inward (FIG. 23, disc D1 to disc D2).

(2) The second sensor SE2 to the sixth sensor SE6 are all turned off (detection of the 12-cm disc (FIG. 23, D3)).

(3) The first sensor SE1 is turned on (by the passage of the center hole of the disc), and the fifth and sixth sensors SE5, SE6 remain off.

(4) The fifth and sixth sensors SE5, SE6 are turned on, and the disc D rolls into the holding groove 31.

(5) A short period of time after the fifth and sixth sensors SE5, SE6 are turned on, i.e., 0.5 seconds thereafter with the present embodiment, the loading motor M2 stops, and the door opening-closing motor M1 is started to close the door 41.

The presence of the disc in the holding groove 31 is stored in the control unit to be described later.

Upon a lapse of 0.5 second after the fifth and sixth sensors SE5, SE6 are turned on, the loading motor M2 is stopped, and the motor M1 is operated, in view of the likelihood that the disc will slip relative to the disc transport rollers 61, 62, and to avoid the resulting objection that the rollers will stop rotating with the disc held by the rollers 61, 62 and the door 41, followed by the subsequent operation.

Procedure for detecting 8-cm disc:

(1)' As indicated at d1 in FIG. 24, the fourth sensor SE4 and the sixth sensor SE6 are turned off, with the third sensor SE3 and the fifth sensor SE5 on.

Alternatively, as indicated at d2 in FIG. 24, the third sensor SE3 and the fifth sensor SE5 are turned off, with the fourth sensor SE4 and the sixth sensor SE6 on.

Thirdly, as indicated at d3 in FIG. 24, one or both of the fifth sensor SE5 and the sixth sensor SE6 are turned off, with the third sensor SE3 and fourth sensor SE4 on.

(2)' The loading motor M2 rotates in a direction opposite the above to rotate the rollers 61, 62 in the disc discharge direction.

(3)' The fifth sensor SE5 and the sixth sensor SE6 are turned on.

(4)' The loading motor M2 stops. (The 8-cm disc is held nipped by the rollers 61, 62.)

If the 8-cm disc is reinserted in the state of (4)', step (2)' is resumed through the above detecting operation.

If the user withdraws the disc in the state of (4)' from the rollers 61, 62, the first sensor SE1 is turned on, and the door opening-closing motor M1 is operated to close the door 41.

*When disc is discharged:

When the open/close button 25 to be described later is pressed, the disc D accommodated in the holding groove 31 of specified number in the magazine 3 is positioned as opposed to the location of the disc insertion-discharge means 4 by the rotation of the magazine 3, and the magazine stops. As already stated, the delivery device 6 operates to rotate the rollers 61, 62 in the disc discharge direction, and the kickout member 7 kicks out the disc into nipping engagement with the rollers 61, 62.

(1) The third sensor SE3 and the fourth sensor SE4 are turned off.

(2) The fifth sensor SE5 and the sixth sensor SE6 are turned on.

(3) The loading motor M2 stops. (The disc is held nipped by the rollers 61, 62.)

Next, (1)' the first sensor SE1 is turned on (when the disc is drawn off from the rollers 61, 62 by the user).

(2)' The door opening-closing motor M1 is energized to close the rotatable door 41.

Alternatively, (1)" the fifth sensor SE5 and the sixth sensor SE6 are turned on (when the disc is pushed in in the step of (3)).

(2)" The loading motor M2 is energized to rotate the roller 61 in the disc drawing-in direction and accommodate the disc in the magazine 3.

When the disc is allowed to stand for a predetermined period of time in step (3), the loading motor M2 rotates in the disc inserting direction to re-accommodate the disc in the magazine.

When to be discharged, the disc is not completely discharged to the outside of the rollers 61, 62 but is held nipped by the rollers 61, 62 as described above. This eliminates the likelihood of the disc rollingly falling through the slit 21 of the front panel 2 and becoming damaged.

When the 8-cm disc is adapted to have 12-cm size with the use of a known annular adaptor (not shown), the disc will, of course, be handled by the same operation as for the 12-cm size disc.

Figure 25:
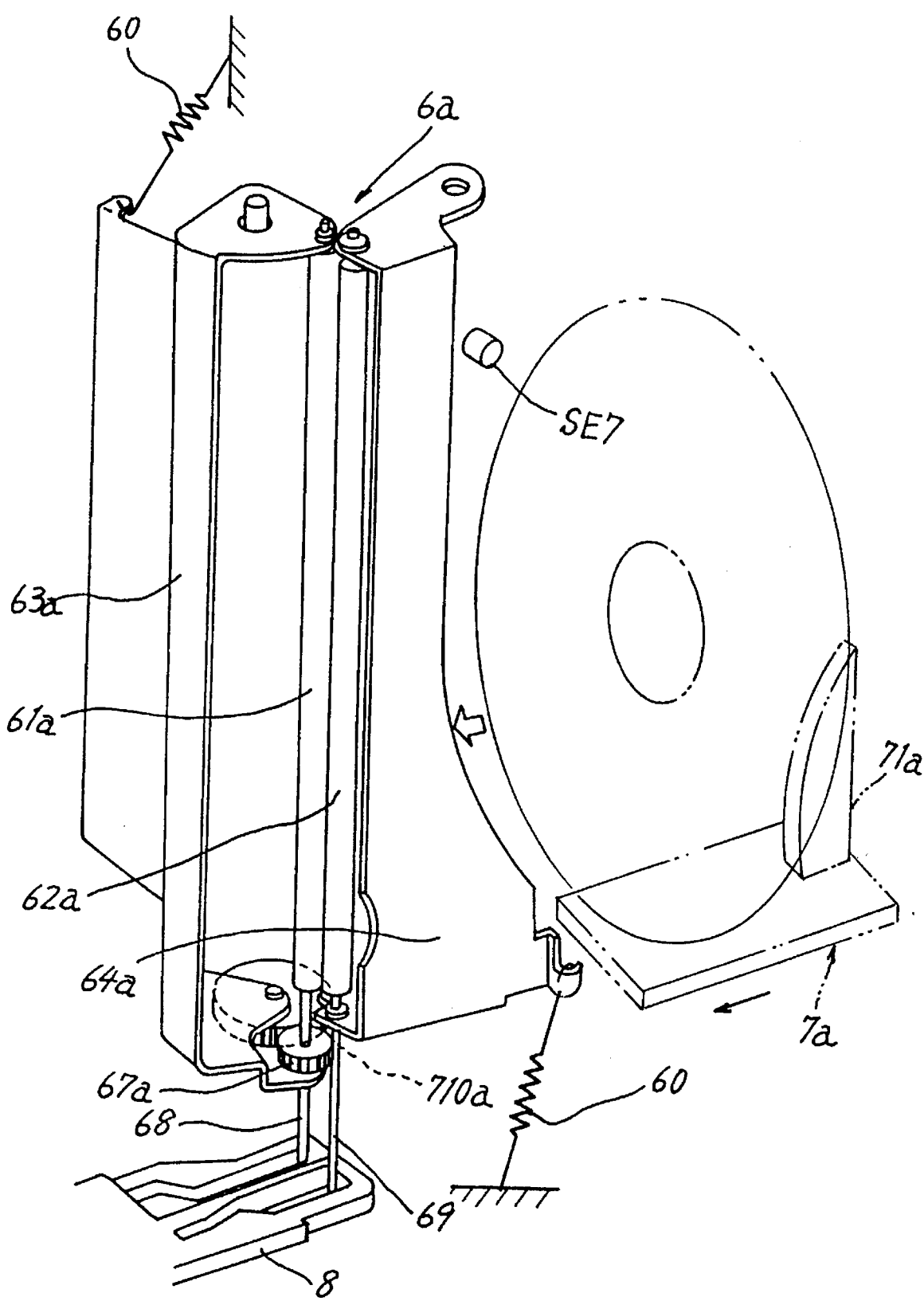
FIG. 25 is a perspective view of a delivery device included in playing means.
Figure 27:
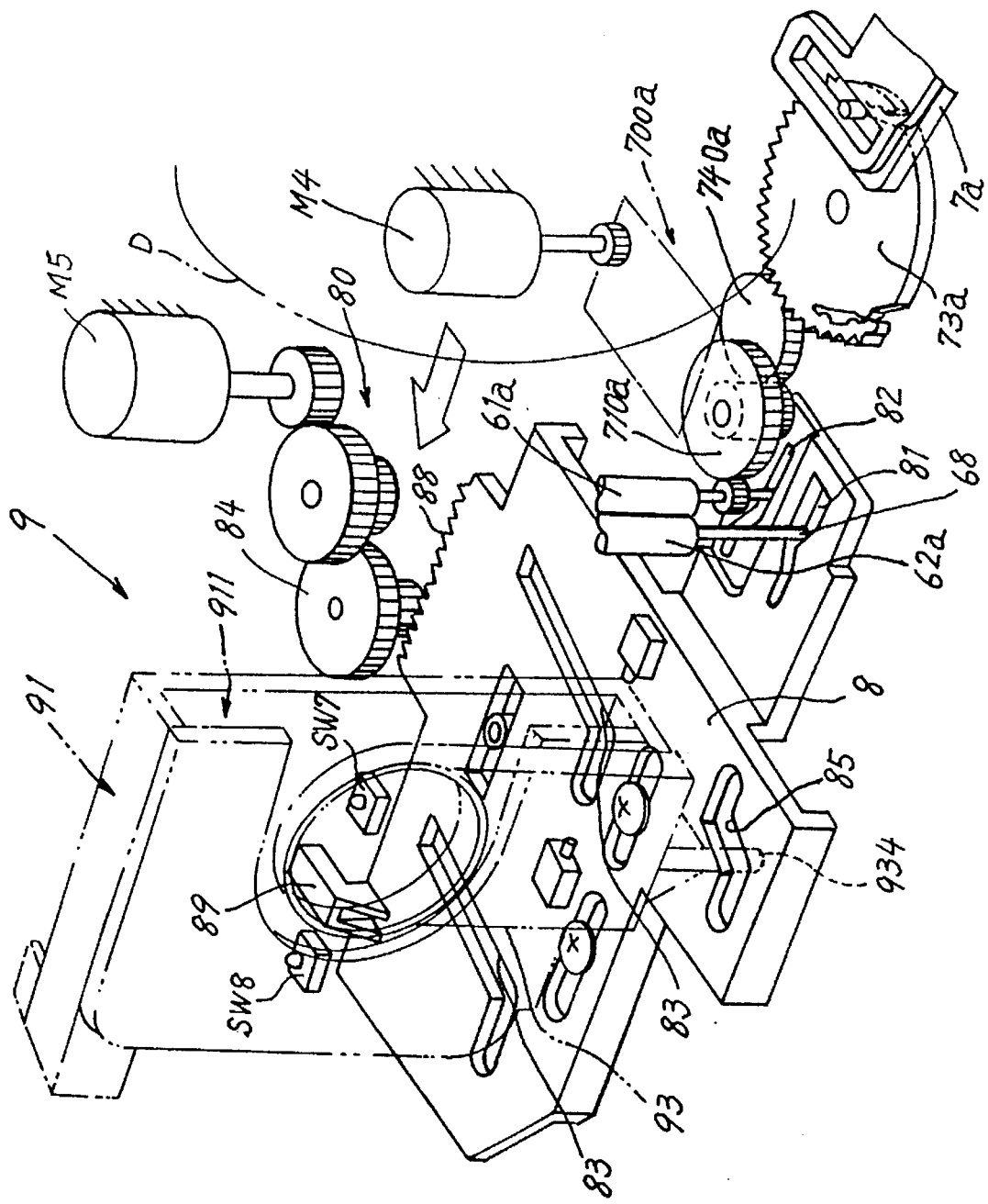
FIG. 27 is a perspective view of the playing means.

Playing Side Delivery Device 6a (see FIGS. 2, 18 and 25 to 27):

As seen in FIGS. 25 and 27, the playing side delivery device 6a is provided for the playing means 9 for delivering the disc from the magazine 3 to the playing means 9 or from the playing means 9 to the magazine 3.

Like the delivery device 6 for the disc insertion-discharge means 4 described, the delivery device 6a comprises a kick-out member 7a slidable on the base chassis 1 for kicking out the disc from the magazine 3, a pair of transport rotatable rollers 61a, 62a for transporting the disc as held therebetween, playing side loading motor M4 for driving the kick-out member 7a and the rollers 61a via a gear train 700a, intermediate gear 740a disposed between the kick-out member 7a and the gear train 700a, control gear 73a, latch plate 750a attached to the underside of the intermediate gear 740a, etc.

As shown in FIG. 2, the switch SW6, which is adapted to detect the retracted position of the kick-out member, is provided for the retracted limit position of the kick-out member 7a. The magazine rotating motor M3 remains unenergized unless the member 7a is detected by the switch, that is, unless it is recognized that the member 7a is in its retracted position and has not advanced into the magazine 3.

The kick-out member 7a has a pushing piece 71a, which functions in the same manner as the pushing piece 71 already described with reference to the disc insertion-discharge side delivery device. More specifically, when the pushing piece 71a has advanced into the slit 32 in the bottom of the magazine 3 to completely kick out the disc D into nipping engagement with the rollers 61a, 62a, the sensor SE7 (playing side disc sensor) stops the loading motor M4 for driving the kick-out member 7a, whereupon the pushing piece 71a remains in the slit 32, preventing the magazine 3 from rotating inadvertently during disc playing.

When the disc is to be delivered by one of the delivery device 6a and the device 6 for the means 4, the other device may be electrically so controlled that the pushing piece 71 or 71a of the kick-out member 7 or 7a of thereof is advanced into a bottom slit 32 of the magazine to such an extent as not to project the corresponding disc. The magazine 3 can then be prevented from inadvertently rotating during the delivery of the disc to cause damage to the disc.

The difference between the playing side delivery device 6a and the insertion-discharge side delivery device 6 is as follows. Of the two rollers 61, 62 of the device 6 for the insertion-discharge means 4, the drive roller 61 remains immovable from its fixed position, while the other roller 62 only moves to releasably nip the disc, whereas as seen in FIG. 25, the rollers 61a, 62a of the playing side device 6a move toward or away from the path of delivery of the disc to releasably nip the disc.

The rollers 61a, 62a are rotatably supported at their upper and lower ends by two support members 63a, 64a, which are pivotally movably supported in a fixed position between the base chassis 1 and the disc upper portion guide member 5.

The roller 61a carries at its lower end a drive gear 67a meshing with a gear 710a at a downstream end of the gear train 700a, and revolves around the gear 710a with the pivotal movement of the support member 63a, with the gear 67a in mesh with the gear 710a.

The two roller support members 63a, 64a are biased by springs 60, 60, respectively, in such directions that the rollers 61a, 62a are pressed against each other.

The rollers 61a, 62a have shafts 68, 69 projecting from the center of their lower ends and fitting in cam grooves 82, 81, respectively, which are formed in a slide plate 8 close to the inner end thereof. The slide plate 8 is provided on the base chassis 1 and slidable on an extension of the path of sliding movement of the kick-out member 7a.

Figure 26A:
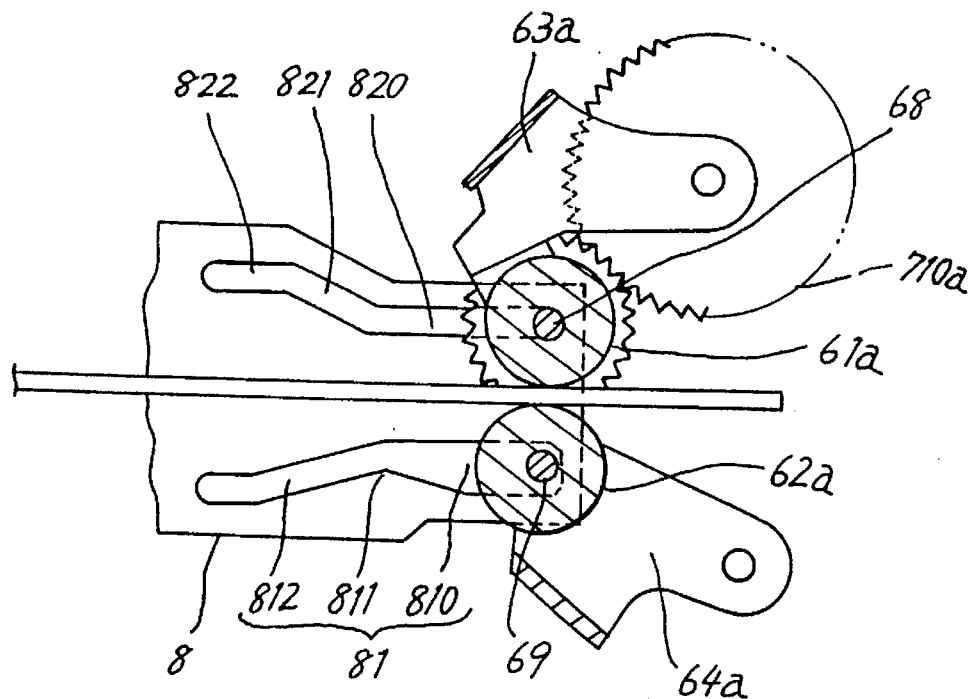
FIG. 26A is a plan view showing a disc while it is being transported by rollers of the delivery device of the playing means.
Figure 26B:
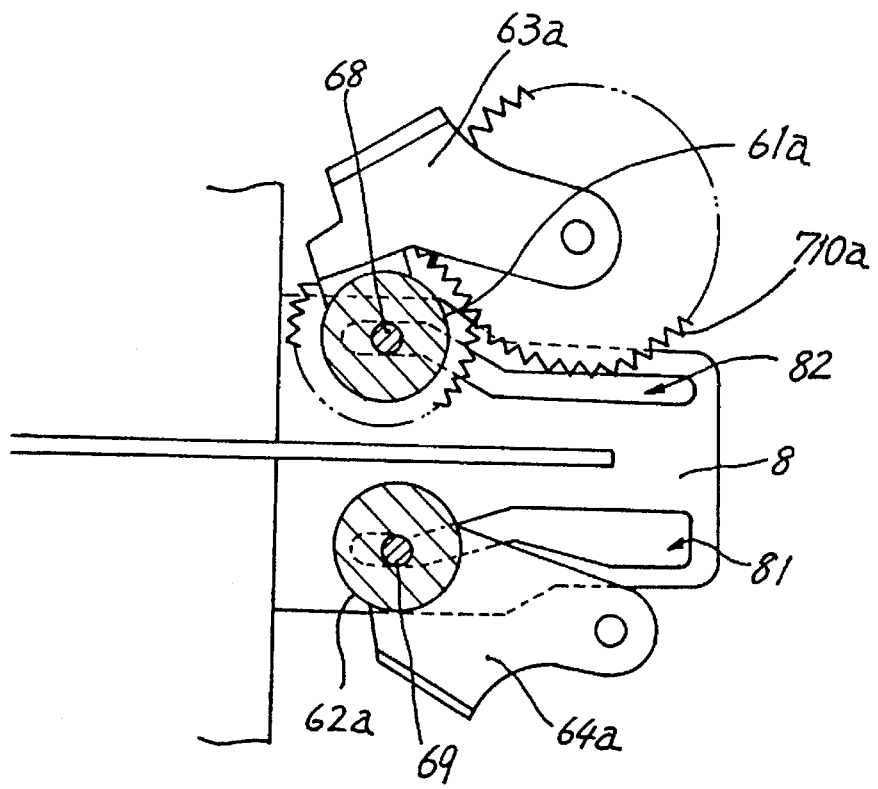
FIG. 26B is a plan view showing the disc as released from the rollers.

As shown in FIG. 26, the cam grooves 81, 82 in the slide plate 8 have, as arranged from the kick-out member 7a toward the playing means 9, parallel portions 810, 820 close to each other, outwardly slanting portions 811, 821 and parallel portions 812, 822, the portions of each groove being continuous with one another. When the slide plate 8 moves toward the kick-out member 7a, the rollers 61a, 62a are moved away from each other to release the disc. When the slide plate 8 moves away from the member 7a, the rollers 61a, 62a move toward each other to hold the disc therebetween.

With reference to FIG. 27, the slide plate 8 is further formed with head side opening-closing cam grooves 83, 83 and a clamp side opening-closing cam groove 85, and has a rack 88 along one side edge thereof in the direction of sliding movement.

The motor M5 for clamping the disc and also for moving the rollers toward or away from each other is coupled to a gear train 80, which includes at a downstream end thereof a gear 84 meshing with the rack 88.

Figure 30:
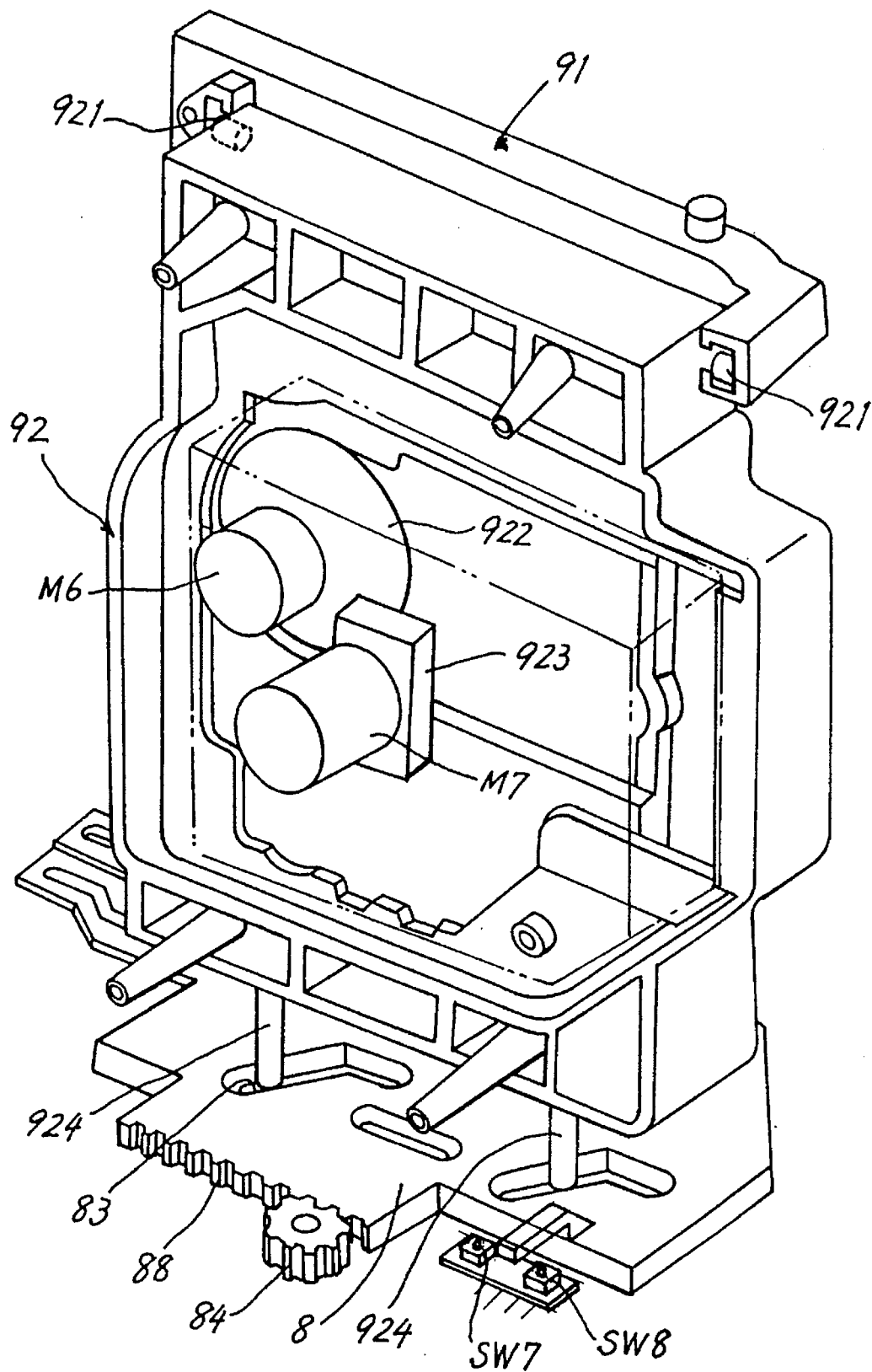
FIG. 30 is a perspective view showing the rear side of the head mount assembly.

Playing Means 9 (FIGS. 2 and 25 to 33):

With reference to FIGS. 27 and 30, the playing means 9 comprises a case 91 for containing the disc supplied from the magazine 3, and a head mount assembly 92 and a clamp 93 which are provided on the respective sides of the case 91 and movable toward each other for rotatably clamping the disc inside the case.

Figure 28:
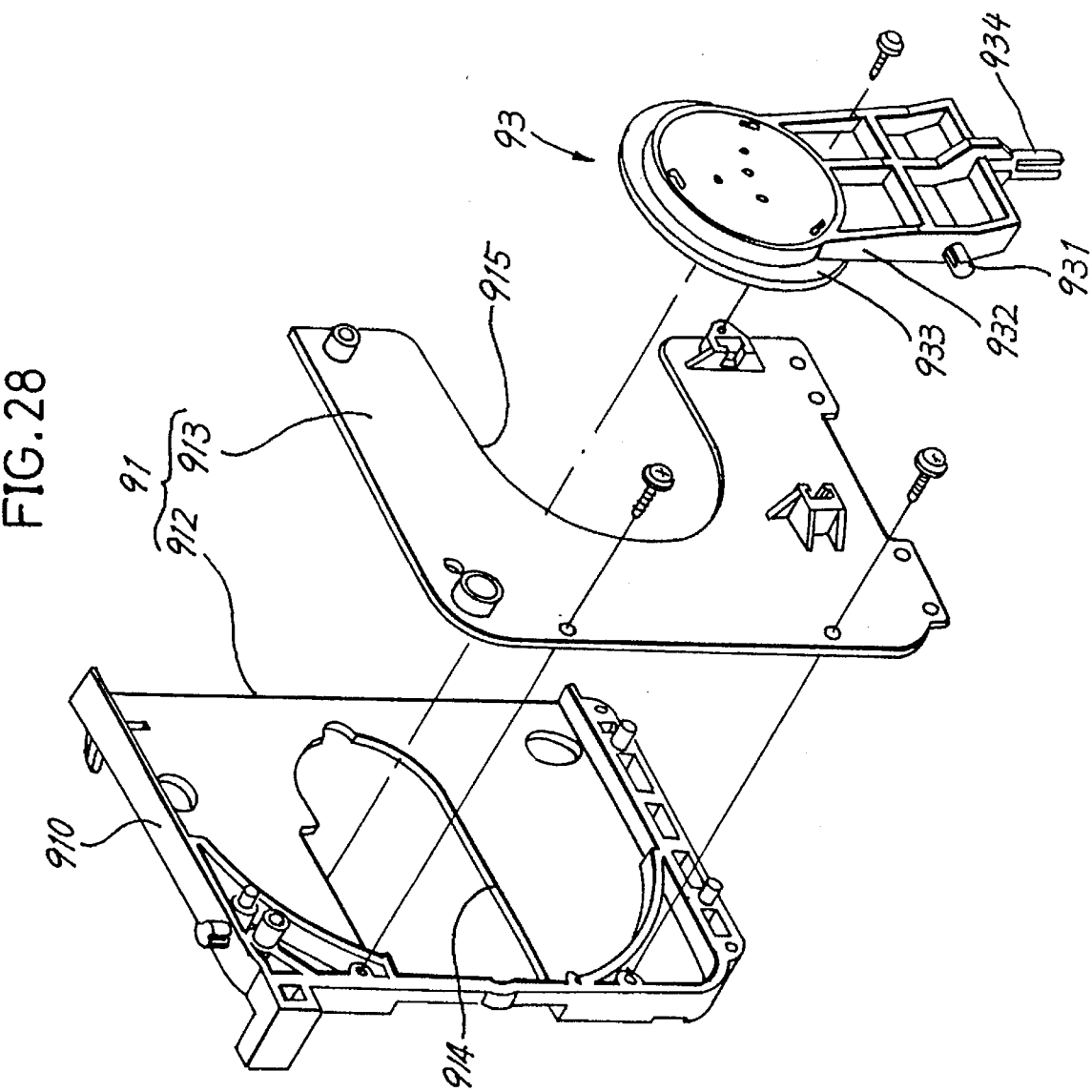
FIG. 28 is an exploded perspective view of a disc containing case and a clamp.
Figure 29:
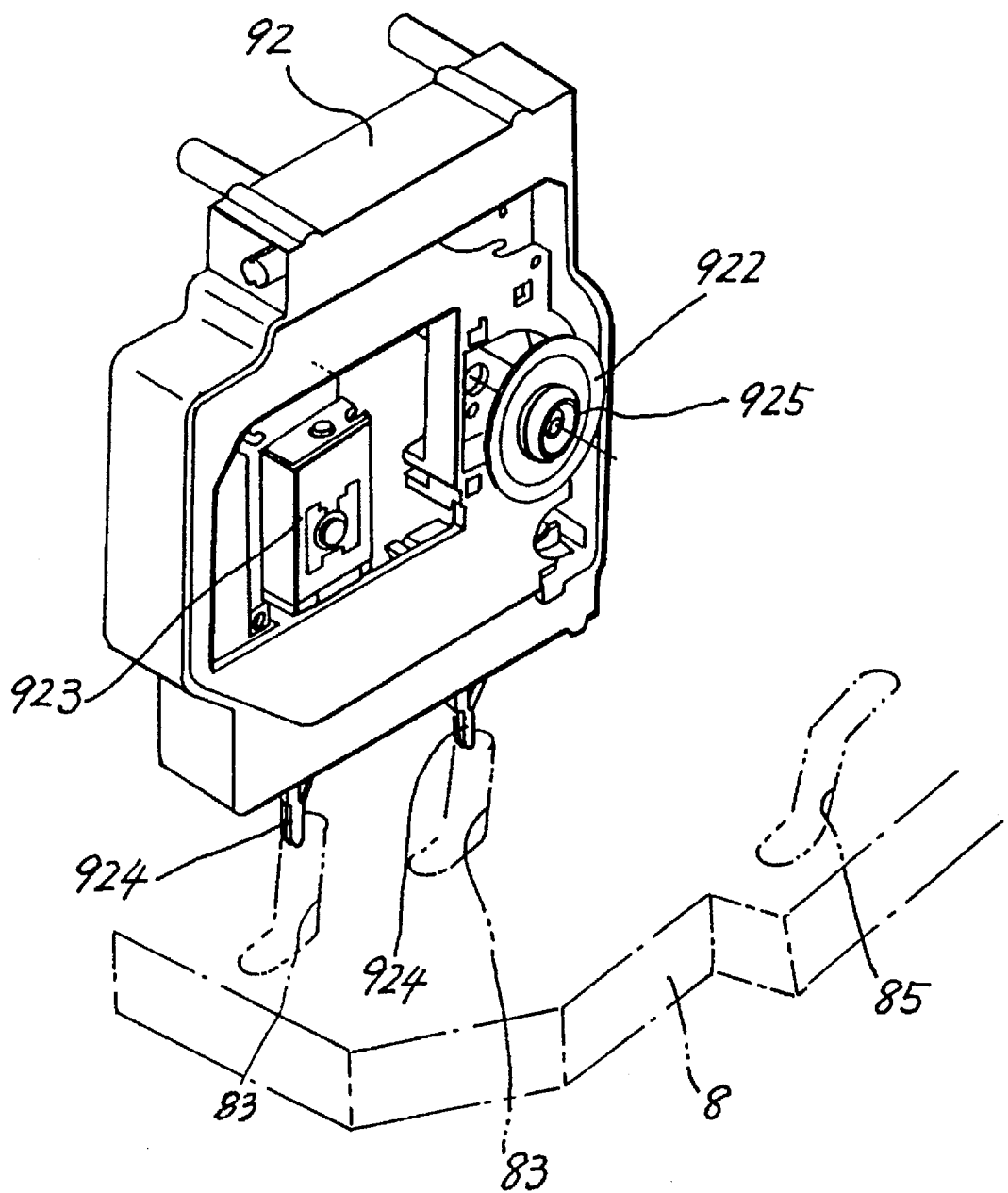
FIG. 29 is a perspective view of a head mount assembly.

As shown in FIG. 28, the disc containing case 91 comprises a plate member 912 having a peripheral plate 910 along three sides thereof other than a disc inlet side, and a plate member 913 joined to the plate member 910, and has a vertically elongated flat form with an opening formed in the disc inlet side.

The case 91 has its opening directed toward the nip of the rollers 61a, 62a and positioned close to the rollers, is located above the path of sliding movement of the slide plate 8 and is fixed to the base chassis 1.

When the disc is contained in the case 91, the disc partly projects beyond the opening toward the magazine 3, with a portion thereof fitting in the magazine 3.

The interior of the case 91 has a small allowance above and below the disc and in a direction orthogonal to the path of advance of the disc.

The plate members 912, 913 of the case are formed with cutouts 914, 915 for permitting a turntable 922 on the head mount assembly 92 and a disk 933 of the clamp 93 to enter the case therethrough, respectively.

As shown in FIG. 30, the head mount assembly 92 comprises the turntable 922 for drivingly rotating the disc, disc rotating motor M6 for driving the turntable 922, head mount 923 having a reading head, and head sliding motor M7 for horizontally driving the head mount 923 by means of a rack and a pinion.

The head mount assembly 92 has pivots 921, 921 projecting from opposite sides of its upper end and rotatably supported by the upper portion of the case 91.

The head mount assembly 92 has two leg pins 924, 924 projecting from the lower end thereof and slidably fitting in the head side opening-closing cam grooves 83, 83 formed in the slider plate 8.

As shown in FIG. 28, the clamp 93 comprises a frame 932 pivotably supported by pivots 931, 931 on the lower portion of the disc containing case 91, and the disk 933 incorporating a magnet as opposed to the turntable 922 and loosely fitted in the frame 932.

The frame 932 has a leg pin 934 projecting from its lower end and slidably fitting in the clamp opening-closing cam groove 85 formed in the slide plate 8.

As seen in FIG. 27, the cam groove 85 and the cam grooves 83, 83 pivotally move the head mount assembly 92 and the clamp 93 about the pivots 921 and 931 toward each other when the slide plate 8 slidingly moves toward the magazine 3, or move the assembly 92 and the clamp 93 away from each other when the slide plate 8 moves away from the magazine 3. Thus, the cam grooves 83, 83, 85 are so inclined with respect to the direction of sliding movement of the slide plate 8 as to effect these movements. However, the clamp opening-closing groove 85 is so shaped as to effect the following movement. The clamp 93 pivotally moves in a direction to clamp the disc and reaches a position where the disc is clamped between the clamp and the turntable 922 at the center of internal width of the case 91 (state shown in FIG. 32). The clamp 93 thereafter slightly pivotally moves toward the right for the disc 933 to permit the rotation of the turntable while being attracted to the turntable 922.

Figure 31:
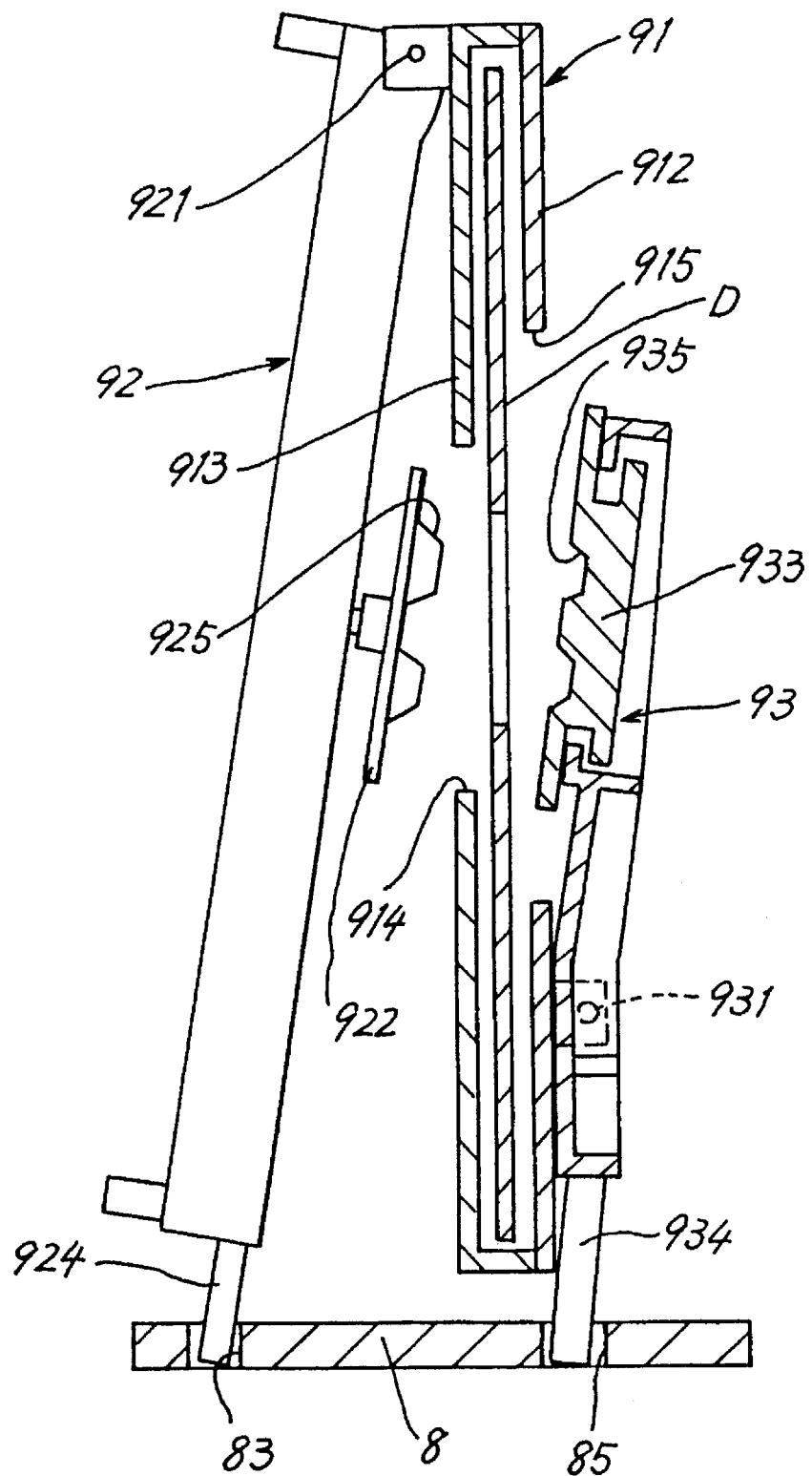
FIG. 31 is a sectional view showing the head mount assembly and the clamp before the disc is clamped.
Figure 32:
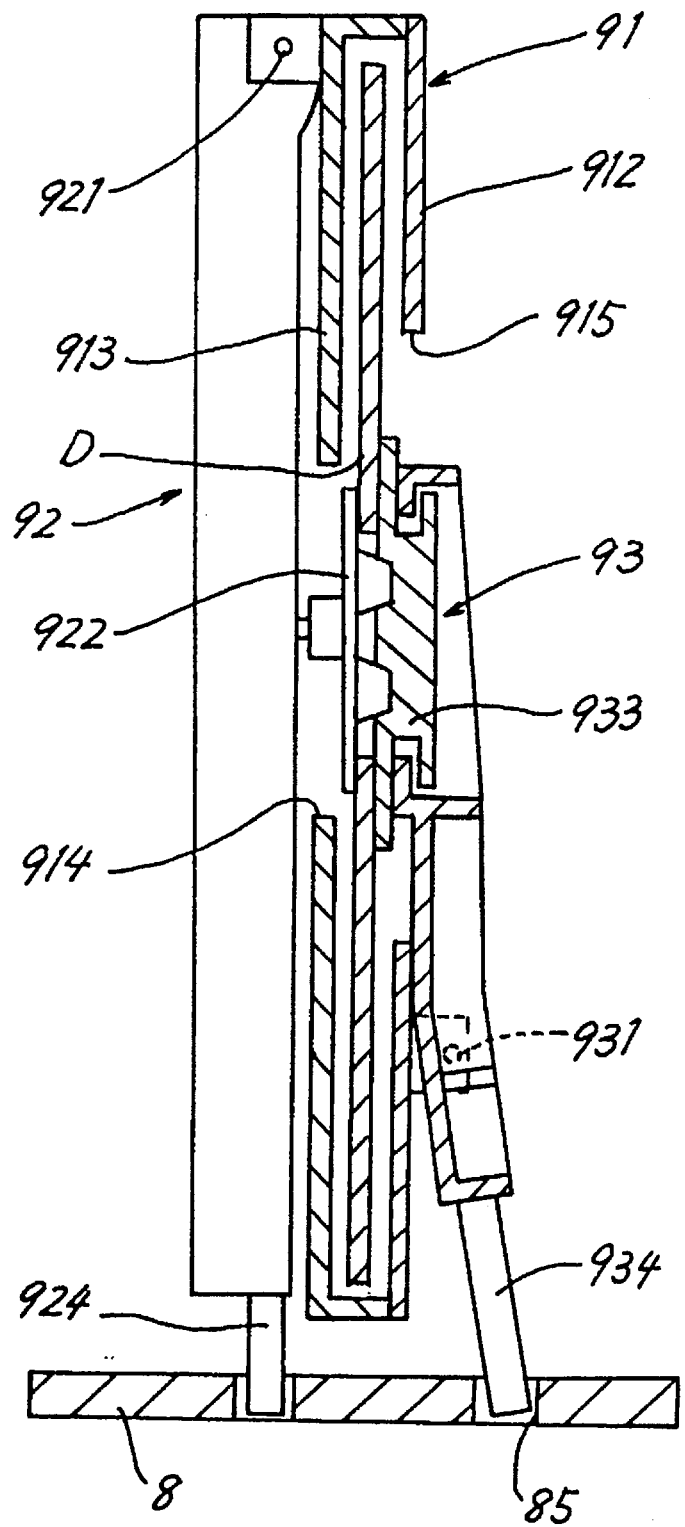
FIG. 32 is a sectional view showing the disc as held by the mount assembly and the clamp.

With reference to FIG. 31, the turntable 922 is centrally provided with a conical projection 925 fittable in the disc hole, and the disk 933 of the clamp 93 is formed with a conical recess 935 for the projection 925 to fit in. The turntable 922 and the disk 933 move toward the disc accommodated in the case 91 as stated above to fit the conical projection 925 into the conical recess 935. At this time, the hole defining edge of the disc slide along the conical projection 925 of the turntable 922, and the disc is pressed by the turntable 922, whereby the turntable 922 and the disc can be reliably positioned concentrically. In this state, the clamp is slightly rotated rightward as stated above to free the disk 933 from the pressure, whereas the disk 933 remains held to the turntable 922 without shifting the center of the disc. Furthermore, the disc D can be clamped while being held out of contact with the inner surface of the case 91.

The operation to play the disc D as clamped in position is known and therefore will not be described.

The rollers 61a, 62a are opened or closed, that is, moved toward or away from each other, and the disc is clamped by the turntable 922 and the clamp 93 by the cam grooves 83, 83, 85 and the roller opening-closing cam grooves 81, 82 in the following timing relation. The rollers 61a, 62a deliver the disc D to the case 91, and the disc is completely clamped by the turntable 922 and the clamp 93, whereupon the rollers 61a, 62a are moved away from each other to relieve the disc of the pressure. When the disc D is to be returned from the playing means 9 to the magazine 3 after playing, the rollers 61a, 62a are moved toward each other to hold the disc, and the disc D is thereafter released from the turntable 922 and the clamp 93. Thus, the disc is held between the rollers 61a, 62a or between the turntable 922 and the clamp 93 always when to be delivered. The disc can therefore be delivered reliably even if the playing device should be inclined as by being lifted during the delivery.

The rollers 61a, 62a are moved toward or away from each other, and the disc is clamped by the turntable 922 and the clamp 93 and released therefrom, by the common slide plate 8 as described above. This ensures reliable trouble-free operation that would otherwise occur due to timing differences.

Although the disc is played as positioned between the rollers 61a, 62a of the delivery device 6a, the rollers are out of contact with the disc and away from the path of delivery of the disc at this time, so that the disc is rotatable trouble-free.

As shown in FIG. 27, the switch SW7 (clamping completion switch) and the switch SW8 (unclamping switch) are arranged along the path of movement of the slide plate 8.

When the slide plate 8 advances toward the magazine 3, a projecting piece 89 on the plate 8 is detected by the clamping completion switch SW7 to stop the clamping motor M5 until the disc is completely clamped.

When the slide plate 8 retracts, the projecting piece 89 is detected by the unclamping switch SW8 to stop the clamping motor M5 until the disc is released from the clamp.

Figure 33:
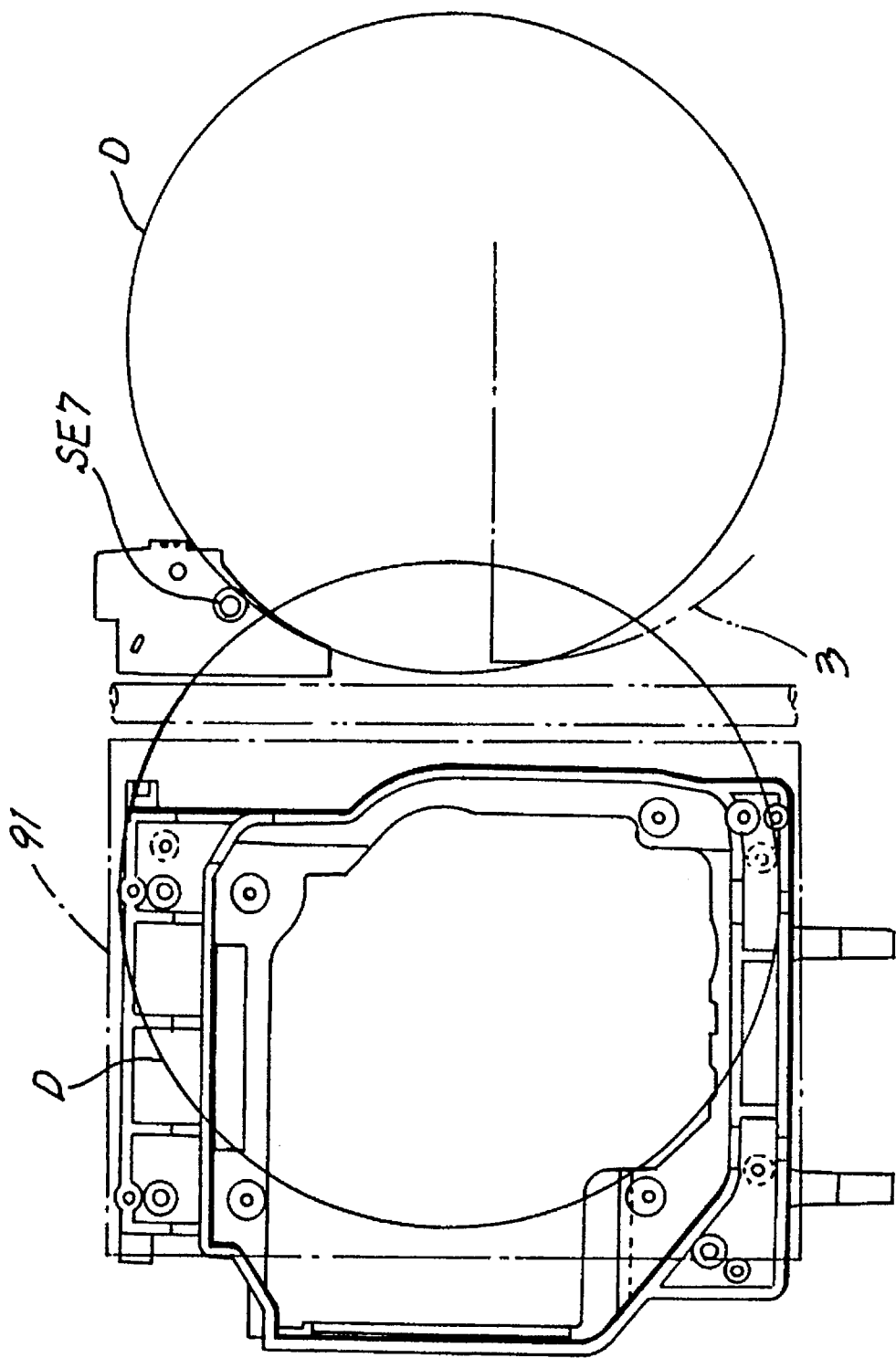
FIG. 33 is a diagram for illustrating a disc sensor in operation for the playing means.

Operation of Sensor SE7:

As shown in FIG. 33, the seventh sensor SE7, like those provided for the disc insertion-discharge means, is disposed near the rollers 61a, 62a of the delivery device 6a on the inner side of the rollers.

The seventh sensor SE7 is disposed in a position where the passage of disc D between the rollers 61a, 62a can be detected and which is outward from the disc as brought to the inner portion of the case 91.

When the disc D is to be played, the seventh sensor SE7 detects the passage of the disc D, i.e., completion of transport of the disc to the playing position. Otherwise, the operation to be performed next is not initiated.

Further, when the disc D is returned from the playing position to the magazine 3, the seventh sensor SE7 detects the passage of the disc D, i.e., completion of accommodation of the disc in the magazine 3. If otherwise, the subsequent operation is not started.

As previously described, the disc is played as partly positioned in the magazine 3. The present playing device can therefore be made smaller than those wherein the disc is played when completely brought out of the magazine.

Data is recorded on only one side of the disc, so that if the disc is accommodated in the magazine 3 with the front side thereof facing toward the reverse direction, the signal reading head is unable to read the data signal from the disc. If the disc is loaded onto the playing means 9 with the wrong side facing the head, the disc is detected as being unreadable, whereupon the disc is returned to the magazine 3.

The disc returned is transported to the position of the disc insertion-discharge means 4 by rotating the magazine 3, whereupon the disc is discharged. This can be accomplished under the control of the control unit to be described later. In the case where a plurality of discs are successively played, the control unit can be caused to store the position of the reversely-oriented disc D, such that then the discs have been all played, the reverse disc D is transported to the discharge means 4 for discharge to the outside.

From Panel and Manipulation Buttons (FIGS. 2 and 12):

With reference to FIG. 12, the front panel 2 has the disc insertion-discharge slit 21 in the center, display 28 at the left upper portion, see-through window 29 at the right upper portion, ON-OFF button 22, PLAY button 23, STOP button 24, open/close button 25 and ten number entry keys 26 in the form of ten key buttons bearing the numbers of 0 to 9, respectively.

The display 28 shows various indications in accordance with different modes of the playing device. The see-through window 29 is used for checking the discs in the magazine 3 for the state of accommodation and rotation therethrough. With an illumination lamp (not shown) provided inside the device, the discs shine in rainbow colors to produce an esthetic effect.

The operations of various mechanisms effected upon depressing front panel buttons will be described briefly. The foregoing eight switches SW1 to SW8, eight disc sensors SE1 to SE8 and seven motors M1 to M7 are electrically connected to a control unit (not shown) including a microprocessor and controlled according to a program.

In the following description, the number of the disc is identical with the number assigned to the corresponding disc holding groove 31 of the magazine 3. For example, the term "disc No. 5" refers to the disc accommodated in the disc holding groove 31 of No. 5.

The ON-OFF button 22 is turned on.

The magazine rotating motor M3 operates to rotate the magazine 3 until the holding groove 31 No. 1 is brought to the position of the disc insertion-discharge means 4.

*Playing disc

There are two kinds of manipulation procedures, i.e., procedure (1) and procedure (2).

Playing procedure (1):

The ten-key arrangement 26 is manipulated to select the desired disc. For example, the keys 26 "1" and "4" are pressed to select the disc No. 14.

Next, the PLAY button 23 is pressed.

The magazine rotating motor M3 rotates to transport the disc of the specified number to the playing means 9.

By the operation previously described in "Playing Means," the disc is delivered from the magazine 3 to the playing means 9 and played. On completion of playing, the disc is accommodated in the original groove of the magazine 3.

The direction of revolution of the disc is so controlled that the angle of rotation needed is smaller.

When the disc is to be revolved, the switches SW4 and SW6 detect the pushing pieces 71, 71a of kick-out members 7, 7a of both the insertion-discharge side delivery device 6 and the playing side delivery device 6a, as positioned in their retracted positions. If otherwise, the magazine rotating motor M3 remains unenergized as previously described. This eliminates the likelihood of the magazine 3 rotating with the pushing pieces 71, 7a fitting in bottom slits 32 of the magazine 3 to break the mechanism concerned.

Playing procedure (2):

The PLAY button 23 is pressed without specifying a disc of particular number.

In this case, the magazine 3 rotates until the disc number indicated on the display 28 is positioned at the playing means 9, and the disc is played.

The disc number shown on the display 28 is the number of the disc which was handled, for example, for playing or accommodation immediately before the current playing procedure. *Insertion and discharge of disc:

There are two kinds of manipulation procedures, i.e., procedure (1) and procedure (2).

Insertion-discharge procedure (1):

The desired disc number is specified by the ten-key arrangement 26, and the open/close button 25 is pressed.

The magazine 3 rotates to position the disc holding groove 31 of the specified number as opposed to the disc insertion-discharge means 4.

When the disc is present in the groove 31 of specified number, the door opening-closing motor M1 operates to open the rotatable door 41, and the insertion-discharge side loading motor M2 operates the delivery device 6 to discharge the disc concerned.

In the absence of the disc in the groove 31 of specified number, the motor M1 operates to open the door 41 in preparation of insertion of disc.

Insertion-discharge procedure (2):

The open/close button 25 is pressed without specifying a particular disc number.

The magazine 3 rotates to position the groove 31 of the number shown on the display 28 as opposed to the insertion-discharge means 4, and the door 41 is opened.

When the disc D is present in the groove 31 of the groove shown on the display, the disc D is discharged. In the absence of disc D, the door prepares for the insertion of the disc.

*Interruption of playing:

When the STOP button 24 is pressed, playing of the disc is discontinued, and the disc is returned to the original position in the magazine 3.

With the present disc playing device, no eject button is provided for use specifically for discharging discs, and the open/close button 25 is used for discharging discs.

For the foregoing operations, the following safety and other measures are taken using electric circuits (some measures are previously described).

In Connection with the Magazine:

(1) The magazine 3 does not rotate unless the disc D moves past the sensor recognizing the transport of disc to the magazine 3, and further unless closing of the door 41 is detected.

(2) The magazine 3 does not rotate unless withdrawal of the kick-out members 7, 7a from slits 32 of the magazine 3.

In Connection with the Door:

(1) The door 41 closes after the disc has moved past the sensor recognizing transport of the disc to the magazine 3.

(2) The door 41 opens after the magazine 3 has stopped rotating, and remains closed during the rotation of the magazine 3.

In Connection with Disc Discharge:

(2) When the disc in the playing means 9 is to be accommodated in the magazine 3 by the STOP button 24 or the open/close button 25, the magazine is likely to be filled up by accommodating the disc. If another disc is to be inserted into the insertion-discharge means 4, the fixed roller 61 for the delivery means 6 rotates in the discharge direction to automatically discharge the disc.

Incidentally, the disc can be prevented from being drawn in by stopping the rotation of the roller 61.

(2) When the disc is loaded onto the playing means 9 with the from side facing toward the wrong direction, this disc is discharged from the magazine upon recognizing that the data signal is not readable from the disc.

Features of the Embodiment:

The disc playing device of the embodiment has the following outstanding features.

1. The disc insertion-discharge slit 21 of the front panel 2, the slit 42 of the door and the insertion guide opening 510 of the insertion guide member 500 have a width decreasing upward and downward from the central of the height and are gradually widened toward the disc inlet side, so that the disc can be prevented from becoming damaged by the frictional contact of the disc recorded portion with the wall defining the slit 21 or 42 or the opening 510 when the disc is inserted.

The slit 21 of the front panel is closed except when the disc is to be inserted or discharged to prevent ingress of extraneous matter through the slit.

2. The door 41 for opening and closing the slit 21 of the front panel 2 is closed by the spring 47 and opened by the slider 410 via the torsion spring 440, so that the door 41 does not rotate even if the slider 410 is moved in the closing direction with the disc held in the slit 42 of the door 41, whereby the disc is prevented from becoming damaged. Even if the fully closed door sensor switch SW1 detects the slider 410 as moved in the door closing direction to the limit position of closing, the subsequent operation can not be effected while the door 41 as fully opened is detected by the disc engagement sensor switch SW3. This provides a double measure for preventing the damage to the disc.

3. The size of discs can be detected by the first sensor SE1 to the sixth sensor SE6 to preclude the insertion of the disc other than the discs of specified size and to avoid the trouble that would occur due to the insertion of the disc of different size into the magazine.

4. The magazine 3 rotates in the direction in which the angle of rotation needed is smaller. This shortens the setting time.

5. The disc upper portion guide member 5 is partially removable, so that the discs therein are removable without removing the entire guide member when the device is carried to the repair shop, thereby increasing convenience.

Because the magazine 3 and the guide member 5 provide a two-component structure for holding discs and because only the magazine 3 is made rotatable, the magazine 3 can be made compact and rendered lightweight and easy to control for rotation. The disc holding grooves 31 need to be made only in the magazine 3 and are therefore easy to make.

6. Each holding groove 31 of the magazine 3 is made to have a width for accommodating a single disc D to prevent insertion of two discs, while the groove 31 has an intermediate portion with a bottom lower than the outer end bottom portion at the outer periphery of the magazine 3. With this simple construction, the magazine 3 is rotatable with good stability, with the disc prevented from jumping out inadvertently.

7. Over the entire length of the groove 31, the groove is tapered toward the bottom and also toward the center of rotation of the magazine 3. The width of groove bottom is made slightly larger than the thickness of the disc D. The outer peripheral portion of the disc can therefore be supported almost without any backlash, while the recorded area of the disc can be held out of contact with the groove-defining wall.

8. The annular elastic member 30 is fitted to the central tubular portion 39 of the magazine where the holding groove 31 has its inner end. The member 30 abates the impulsive noise that would otherwise occur when the disc D falls into the groove 31.

9. The upper end edge defining the groove 31 is higher than the lowest portion of the groove bottom for supporting the disc by an amount corresponding to the radius of the disc. The edge of the disc can be held between the adjacent edges of the grooved portion at its upper end, whereby the disc can be stably supported.

10. Since the disc D is played as partially positioned in the magazine D, the device can be made smaller in size than playing devices wherein the disc is completely withdrawn from the magazine when played.

11. In the playing means 9, the disc D is handled for delivery with the following timing. The transport rollers 61a, 62a deliver the disc D to the case 91, and the disc is completely clamped by the turntable 922 and the clamp 93, whereupon the rollers 61a, 62a are moved away from each other to release the disc from the pressure. When the disc D is to be returned from the playing means 9 to the magazine 3 after playing, the rollers 61a, 62a are moved toward each other to hold the disc, and the disc D is thereafter released from the turntable 922 and the clamp 93. Accordingly, the disc is held between the rollers 61a, 62a or between the turntable 922 and the clamp 93 always when to be delivered. Thus, the disc can be delivered reliable without falling even if the playing device is inclined during delivery.

12. The rollers 61a, 62a are moved toward or away from each other, and the disc is clamped by the turntable 922 and the clamp 93 and released therefrom by the sliding movement of a single slide plate 8. This ensures a reliable operation free of trouble that would otherwise occur due to timing differences.

The present invention is not limited to the construction of the foregoing embodiment but can be modified variously without departing from the scope as defined is the appended claims.

What is claimed is:

1. A disc playing device for accommodating a plurality of discs and for playing a desired disc, or to eject a disc outside the device and replace the disc with another disc, comprising:

a base chassis;

a dish-shaped magazine having an open upper side mounted on the chassis and formed with a plurality of vertical disc holding grooves radically extending from a central portion of said magazine toward an outer periphery of said magazine;

a guide member covering the magazine from above and fixed to the base chassis; and disc insertion-drive means disposed as opposed to a specified one of the disc holding grooves, each of the disc holding grooves having a length larger than the diameter of the disc to be inserted thereinto and an intermediate bottom portion smoothly continuous with an outer peripheral bottom portion thereof, wherein the intermediate bottom portion is at a lower position than the outer peripheral bottom portion, wherein the magazine is rotatably mounted on a support post provided upright on the base chassis, and the base chassis is provided with electric drive means for rotating the magazine, and wherein the guide member is supported by a central leg fitted to the upper portion of the support post and a plurality of legs fitted to guide member support posts provided on the base chassis in the vicinity of the outer periphery of the magazine, and has an inner guide surface defining a large annular groove of a circular-arc cross section approximately matching the outer periphery of the disc in curvature to prevent the disc from falling from the magazine, the guide member being formed with guide grooves spaced apart by a same angle as the angle between disc insertion-discharge means and playing means about the central leg and permitting the disc to be delivered to the magazine radially of the guide member.

2. A disc playing device as defined in claim 1 wherein the magazine has at its center a tubular portion rotatably fitted to the support post, and the tubular portion is provided therearound with an annular elastic member for abating an impulsive noise to be produced by the disc when the disc is inserted.

\* \* \* \* \*